US012044422B2

(12) United States Patent
Suzuki et al.

(10) Patent No.: US 12,044,422 B2
(45) Date of Patent: Jul. 23, 2024

(54) REFRIGERATION CYCLE SYSTEM

(71) Applicant: DAIKIN INDUSTRIES, LTD., Osaka (JP)

(72) Inventors: Shuuichi Suzuki, Osaka (JP); Shinya Matsuoka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 264 days.

(21) Appl. No.: 17/570,974

(22) Filed: Jan. 7, 2022

(65) Prior Publication Data

US 2022/0128254 A1 Apr. 28, 2022

Related U.S. Application Data

(63) Continuation of application No. PCT/JP2020/026622, filed on Jul. 8, 2020.

(30) Foreign Application Priority Data

Jul. 12, 2019 (JP) ................................ 2019-130643

(51) Int. Cl.
*F24F 11/36* (2018.01)
*F24F 11/52* (2018.01)
(Continued)

(52) U.S. Cl.
CPC .............. *F24F 11/36* (2018.01); *F24F 11/52* (2018.01); *F24F 11/526* (2018.01); *F24F 11/63* (2018.01); *G08B 21/18* (2013.01)

(58) Field of Classification Search
CPC ..... F24F 11/36; G08B 21/18; F25B 2500/222
See application file for complete search history.

(56) References Cited

U.S. PATENT DOCUMENTS 4,535,598 A * 8/1985 Mount .................. G08B 19/00 62/226
2019/0264965 A1* 8/2019 Tanaka ................. F25B 49/005

FOREIGN PATENT DOCUMENTS

EP 3 315 880 A1 5/2018
GB 2555256 * 10/2017 ............. F25B 49/02
(Continued)

OTHER PUBLICATIONS

International Preliminary Report of corresponding PCT Application No. PCT/JP2020/026622 dated Jan. 27, 2022.
(Continued)

*Primary Examiner* — Thomas S Mccormack
(74) *Attorney, Agent, or Firm* — Global IP Counselors, LLP

(57) ABSTRACT

A refrigeration cycle system includes a refrigeration cycle apparatus, an operation signal transmitter, a detection unit, a notification unit, and a processing unit. The refrigeration cycle apparatus includes a refrigerant circuit. The operation signal transmitter transmits an operation signal for the refrigeration cycle apparatus. The detection unit detects leakage of a refrigerant. The notification unit notifies of leakage of the refrigerant by emitting at least one of sound and light in a case in which the detection unit has detected leakage of the refrigerant. The processing unit causes the notification unit to execute test behavior of emitting at least one of sound and light in a case in which the operation signal transmitter transmits the operation signal to the refrigeration cycle apparatus.

20 Claims, 10 Drawing Sheets

(51) Int. Cl.

| | |
|---|---|
| ***F24F 11/526*** | (2018.01) |
| ***F24F 11/63*** | (2018.01) |
| ***G08B 21/18*** | (2006.01) |

(56) References Cited

FOREIGN PATENT DOCUMENTS

| | | | |
|---|---|---|---|
| GB | 2555256 | A | 4/2018 |
| JP | 60-259866 | A | 12/1985 |
| JP | 2012-193884 | A | 10/2012 |
| WO | 2017/002213 | A1 | 1/2017 |

OTHER PUBLICATIONS

European Search Report of corresponding EP Application No. 20 84 0391.5 dated Jul. 29, 2022.
International Search Report of corresponding PCT Application No. PCT/JP2020/026622 dated Sep. 15, 2020.

* cited by examiner

B1 OUTPUT COMMAND SIGNAL
B2 TEST SIGNAL
B3 TEST BEHAVIOR CONTROL SIGNAL
C OPERATION SIGNAL

B2 TEST SIGNAL
B3 TEST BEHAVIOR CONTROL SIGNAL
C OPERATION SIGNAL

REFRIGERATION CYCLE SYSTEM

CROSS-REFERENCE TO RELATED APPLICATIONS

This is a continuation of International Application No. PCT/JP2020/026622 filed on Jul. 8, 2020, which claims priority to Japanese Patent Application No. 2019-130643, filed on Jul. 12, 2019. The entire disclosures of these applications are incorporated by reference herein.

BACKGROUND

Field of Invention

The present disclosure relates to a refrigeration cycle system, specifically to a refrigeration cycle system including a notification unit configured to notify refrigerant leakage upon detection of refrigerant leakage.

Background Information

Against refrigerant leakage from a refrigeration cycle apparatus, there may be adopted a refrigeration cycle system including a notification unit configured to notify refrigerant leakage with sound and light upon detection of refrigerant leakage. The notification unit is required to correctly behave upon refrigerant leakage.

JP 2012-193884 A discloses provision of a test switch for inspection as to whether an LED and a buzzer for notification of refrigerant leakage behave correctly, and behavior check of the LED and the buzzer by operating the switch. Such a configuration reduces a situation where the LED or the buzzer does not behave when the LED and the buzzer are supposed to behave.

SUMMARY

A refrigeration cycle system according to a first aspect includes a refrigeration cycle apparatus, an operation signal transmitter, a detection unit, a notification unit, and a processing unit. The refrigeration cycle apparatus includes a refrigerant circuit. The operation signal transmitter is configured to transmit an operation signal for the refrigeration cycle apparatus. The detection unit is configured to detect leakage of a refrigerant. The notification unit is configured to notify of leakage of the refrigerant by emitting at least one of sound and light in a case in which the detection unit has detected leakage of the refrigerant. The processing unit is configured to cause the notification unit to execute test behavior of emitting at least one of sound and light in a case in which the operation signal transmitter transmits the operation signal to the refrigeration cycle apparatus.

DETAILED DESCRIPTION OF EMBODIMENT(S)

Figure 1:
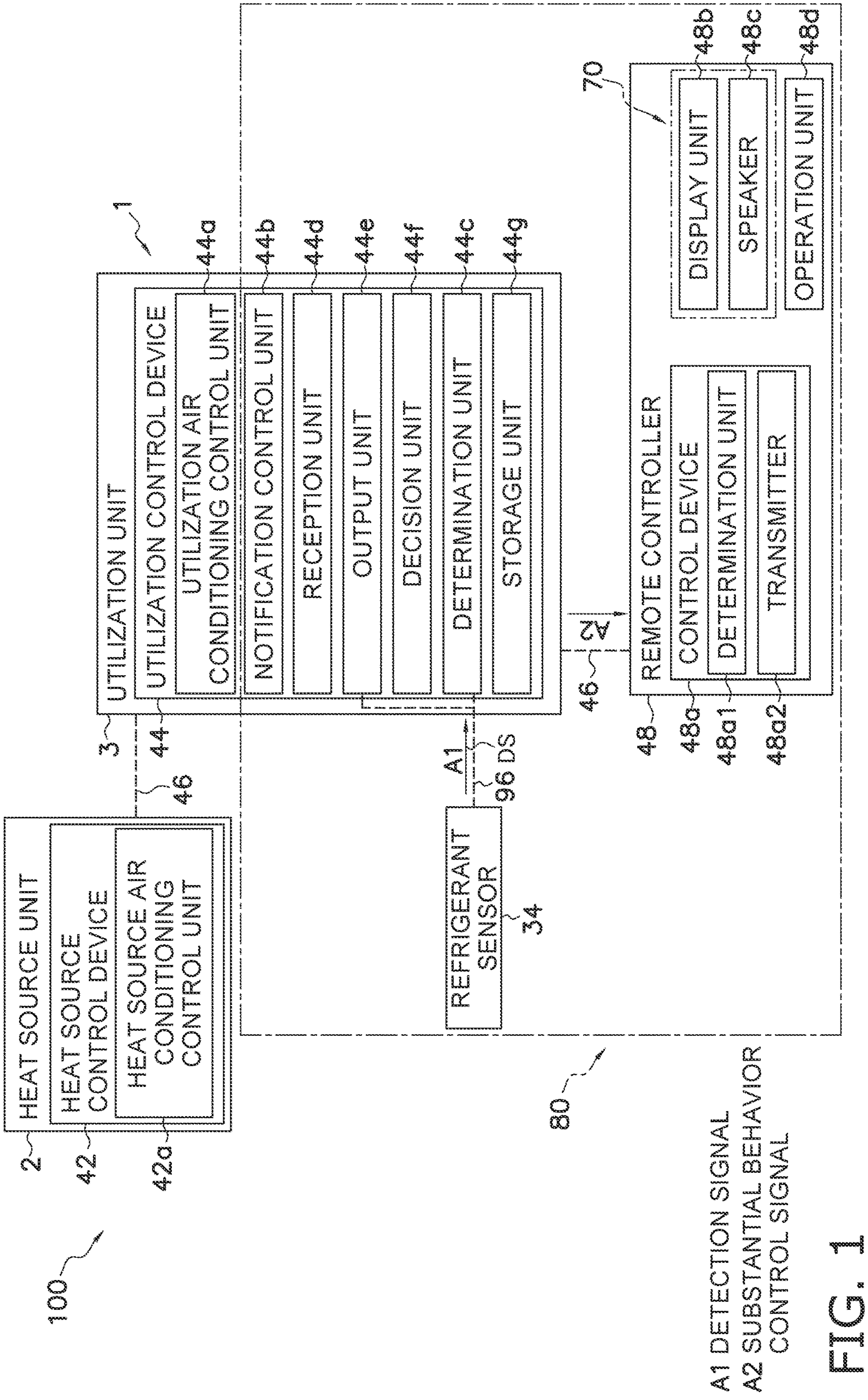
FIG. 1 is a block diagram of an air conditioning system as a refrigeration cycle system according to an example, indicating, by means of arrows, flows of signals upon detection of refrigerant leakage by a refrigerant sensor.

Description is made to a refrigeration cycle system according to an embodiment of the present disclosure.

(1) OVERALL OUTLINE

The refrigeration cycle system according to the present disclosure includes a refrigeration cycle apparatus and a refrigerant leakage notifying device 80. The refrigeration cycle apparatus is configured to cool or heat a cooling or heating target by means of a vapor compression refrigeration cycle. The refrigerant leakage notifying device 80 is configured to detect a refrigerant by means of the refrigerant sensor 34, and notify refrigerant leakage with at least one of sound and light upon detection of refrigerant leakage. The refrigeration cycle system according to the present embodiment is an air conditioning system 100 including an air conditioner 1 exemplifying the refrigeration cycle apparatus and the refrigerant leakage notifying device 80. The air conditioner 1 includes a refrigerant circuit 6 and is configured to condition air in an air conditioning target space.

The air conditioning system 100 merely exemplifies the refrigeration cycle system, and the refrigeration cycle system according to the present disclosure is not limited to the air conditioning system 100. Examples of the refrigeration cycle system according to the present disclosure include a cooling system or a refrigeration system having, as the refrigeration cycle apparatus, a cooling apparatus or a refrigeration apparatus configured to cool an internal space by means of a refrigeration cycle. The examples of the refrigeration cycle system according to the present disclosure also include a hot water supply system or a floor heating system having, as the refrigeration cycle apparatus, a hot water supply apparatus or a floor heater configured to heat liquid such as water by means of the refrigeration cycle.

Figure 2:
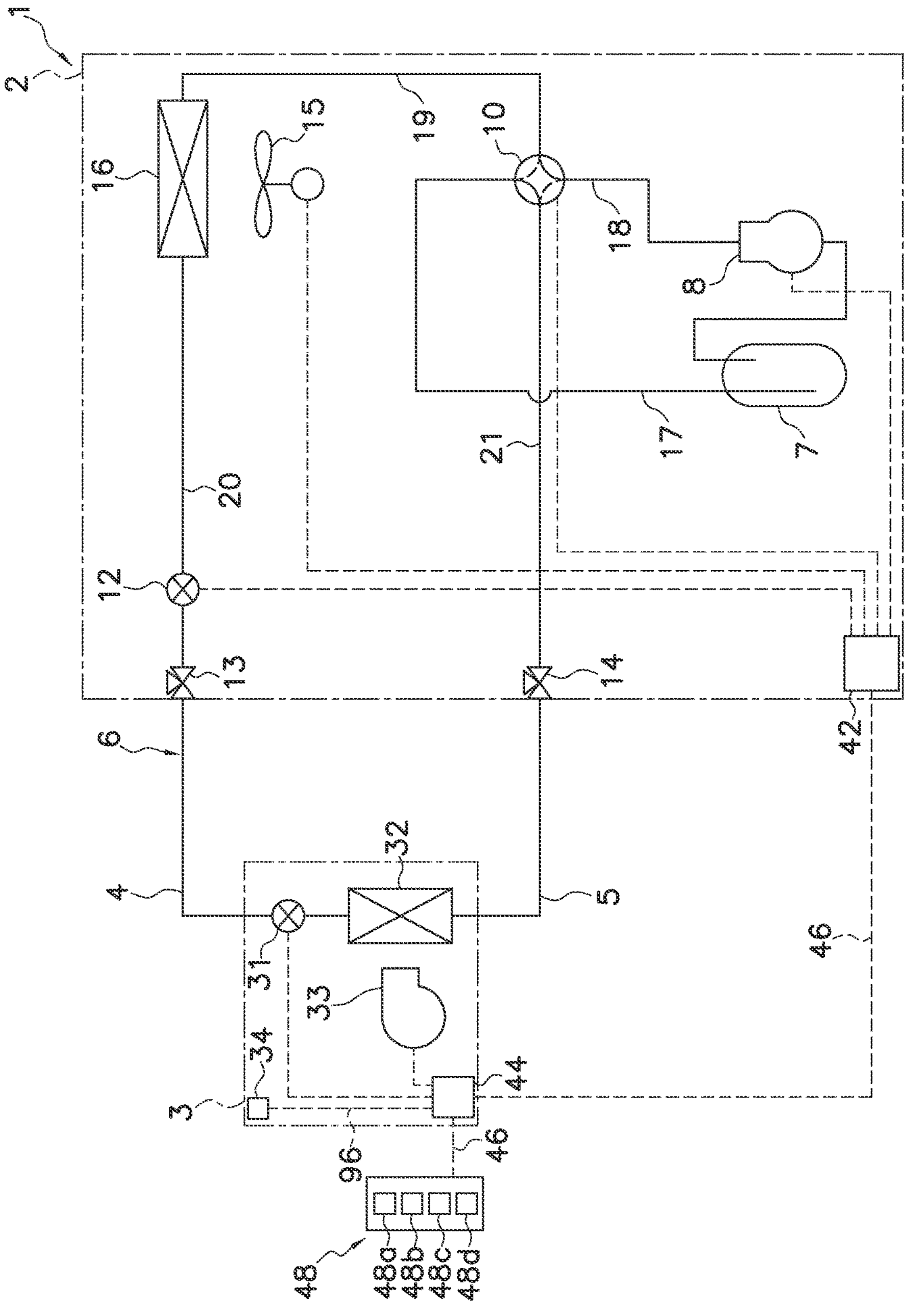
FIG. 2 is a schematic configuration diagram of an air conditioner included in the air conditioning system depicted in FIG. 1.

With reference to FIGS. 1 and 2, description will be made initially to the air conditioning system 100 exemplifying the refrigeration cycle system according to the present disclosure. FIG. 1 is a block diagram of the air conditioning system 100. FIG. 2 is a schematic configuration diagram of the air conditioner 1 included in the air conditioning system 100. FIG. 1 does not depict constituents of the refrigerant circuit 6 or various constituents such as fans 15 and 33 of the air conditioner 1.

(2) DETAILED CONFIGURATIONS

The air conditioner 1 and the refrigerant leakage notifying device 80 will be described in detail below.

(2-1) Air Conditioner

The air conditioner 1 is configured to achieve the vapor compression refrigeration cycle to cool and heat the air conditioning target space. Examples of the air conditioning target space include a space in a building such as an office building, a commercial facility, or a residence. The air conditioner 1 may not be adopted to cool as well as heat the air conditioning target space, but may alternatively be adopted to only one of cooling operation and heating operation.

As depicted in FIG. 2, the air conditioner 1 principally includes a heat source unit 2, a utilization unit 3, a liquid refrigerant connection pipe 4, a gas refrigerant connection pipe 5, and a remote controller 48. The heat source unit 2 includes a heat source control device 42. The utilization unit 3 includes a utilization control device 44. The remote controller 48 includes a control device 48*a*. The heat source control device 42, the utilization control device 44, and the control device 48*a* cooperatively function as an air conditioning control unit configured to control behavior of various parts in the air conditioner 1. The utilization control device 44 functions also as a controller of the refrigerant leakage notifying device 80. The liquid refrigerant connection pipe 4 and the gas refrigerant connection pipe 5 connect the heat source unit 2 and the utilization unit 3. In the air conditioner 1, the heat source unit 2 and the utilization unit 3 are connected via the refrigerant connection pipes 4 and 5 to constitute the refrigerant circuit 6.

Though not limited, the refrigerant circuit 6 encloses a flammable refrigerant. Examples of the flammable refrigerant include refrigerants categorized in Class 3 (higher flammability), Class 2 (lower flammability), and Subclass 2L (slight flammability) in the standards according to ASHRAE 34 Designation and safety classification of refrigerant in the U.S.A. or the standards according to ISO 817 Refrigerants—Designation and safety classification.

Exemplarily adopted as the refrigerant is any one of R1234yf, R1234ze(E), R516A, R445A, R444A, R454C, R444B, R454A, R455A, R457A, R459B, R452B, R454B, R447B, R32, R447A, R446A, and R459A.

The present embodiment adopts R32 as the refrigerant used therein. The configuration according to the present disclosure is useful also in a case where the refrigerant is not flammable.

The air conditioner 1 includes the single heat source unit 2 as depicted in FIG. 2. The air conditioner 1 includes the single utilization unit 3 as depicted in FIG. 2. The air conditioner 1 may alternatively include a plurality of utilization units 3 connected in parallel to the heat source unit 2. Still alternatively, the air conditioner 1 may include a plurality of heat source units 2.

Further description is made hereinafter to the heat source unit 2, the utilization unit 3, the refrigerant connection pipes 4 and 5, and the remote controller 48. The heat source control device 42 will be described separately from the remaining constituents of the heat source unit 2. The utilization control device 44 will be described separately from the remaining constituents of the utilization unit 3.

(2-1-1) Heat Source Unit

With reference to FIG. 2, description is made to an exemplary configuration of the heat source unit 2 other than the heat source control device 42.

The heat source unit 2 is disposed outside the air conditioning target space, such as on a roof of a building or adjacent to a wall of the building.

The heat source unit 2 principally includes an accumulator 7, a compressor 8, a flow direction switching mechanism 10, a heat source heat exchanger 16, a heat source expansion mechanism 12, a liquid-side shutoff valve 13, a gas-side shutoff valve 14, and a heat source fan 15 (see FIG. 2). The heat source unit 2 may not include some of the constituents described herein. In an exemplary case where the air conditioner 1 only cools the air conditioning target space, the heat source unit 2 may not include the flow direction switching mechanism 10. The heat source unit 2 may include, as necessary, a constituent not described herein.

The heat source unit 2 principally includes, as a refrigerant pipe connecting various constituents of the refrigerant circuit 6, a suction pipe 17, a discharge pipe 18, a first gas refrigerant pipe 19, a liquid refrigerant pipe 20, and a second gas refrigerant pipe 21 (see FIG. 2). The suction pipe 17 connects the flow direction switching mechanism 10 and a suction side of the compressor 8. The suction pipe 17 is provided with the accumulator 7. The discharge pipe 18 connects a discharge side of the compressor 8 and the flow direction switching mechanism 10. The first gas refrigerant pipe 19 connects the flow direction switching mechanism 10 and a gas side of the heat source heat exchanger 16. The liquid refrigerant pipe 20 connects a liquid side of the heat source heat exchanger 16 and the liquid-side shutoff valve 13. The liquid refrigerant pipe 20 is provided with the heat source expansion mechanism 12. The second gas refrigerant pipe 21 connects the flow direction switching mechanism 10 and the gas-side shutoff valve 14.

The compressor 8 is configured to suck a low-pressure refrigerant in the refrigeration cycle from the suction pipe 17, compress the refrigerant by means of a compression mechanism (not depicted), and discharge the compressed refrigerant to the discharge pipe 18.

The flow direction switching mechanism 10 is configured to switch a refrigerant flow direction to change a state of the refrigerant circuit 6 between a first state and a second state. The present embodiment provides the flow direction switching mechanism 10 implemented as a four-way switching valve. The flow direction switching mechanism 10 should not be limited to this case, but may alternatively be constituted by plural valves and pipes. When the refrigerant circuit 6 is in the first state, the heat source heat exchanger 16 functions as a refrigerant radiator (condenser) and a utilization heat exchanger 32 functions as a refrigerant evaporator. When the refrigerant circuit 6 is in the second state, the heat source heat exchanger 16 functions as a refrigerant evaporator and the utilization heat exchanger 32 functions as a refrigerant radiator. When the flow direction switching mechanism 10 brings the refrigerant circuit 6 into the first state, the flow direction switching mechanism 10 causes the suction pipe 17 to communicate with the second gas refrigerant pipe 21 and causes the discharge pipe 18 to communicate with the first gas refrigerant pipe 19 (see solid lines in the flow direction switching mechanism 10 in FIG. 2). When the flow direction switching mechanism 10 brings the refrigerant circuit 6 into the second state, the flow direction switching mechanism 10 causes the suction pipe 17 to communicate with the first gas refrigerant pipe 19 and causes the discharge pipe 18 to communicate with the second gas refrigerant pipe 21 (see broken lines in the flow direction switching mechanism 10 in FIG. 2).

The heat source heat exchanger 16 is configured to cause heat exchange between a refrigerant flowing inside and air (heat source air) at an installation site of the heat source unit 2. The heat source heat exchanger 16 should not be limited in terms of its type, but is exemplified by a fin-and-tube heat exchanger including plural heat transfer tubes and fins (not depicted). The heat source heat exchanger 16 has a first end connected to the first gas refrigerant pipe 19. The heat source heat exchanger 16 has a second end connected to the liquid refrigerant pipe 20.

The heat source expansion mechanism 12 is disposed between the heat source heat exchanger 16 and the utilization heat exchanger 32 in the refrigerant circuit 6. The heat source expansion mechanism 12 is disposed on the liquid refrigerant pipe 20 between the heat source heat exchanger 16 and the liquid-side shutoff valve 13. The heat source expansion mechanism 12 is configured to adjust pressure and a flow rate of a refrigerant flowing in the liquid refrigerant pipe 20. The heat source expansion mechanism 12 according to the present embodiment is implemented as an electronic expansion valve having a variable opening degree. The heat source expansion mechanism 12 may alternatively be implemented as a temperature sensitive cylinder expansion valve, a capillary tube, or the like.

The accumulator 7 is a vessel having a gas-liquid separation function of separating a received refrigerant into a gas refrigerant and a liquid refrigerant. The accumulator 7 is also a vessel having a function of reserving an excessive refrigerant generated due to operation load change or the like.

The liquid-side shutoff valve 13 is provided at a connecting portion between the liquid refrigerant pipe 20 and the liquid refrigerant connection pipe 4. The gas-side shutoff valve 14 is provided at a connecting portion between the second gas refrigerant pipe 21 and the gas refrigerant connection pipe 5. The liquid-side shutoff valve 13 and the gas-side shutoff valve 14 are opened while the air conditioner 1 is in operation.

The heat source fan 15 is configured to suck heat source air outside of the heat source unit 2 into a casing (not depicted) of the heat source unit 2, supply the heat source heat exchanger 16 with the heat source air, and discharge air having exchanged heat with a refrigerant in the heat source heat exchanger 16 to the outside of the casing of the heat source unit 2. Examples of the heat source fan 15 include a propeller fan. The heat source fan 15 should not be limited to the propeller fan but may be appropriately selected in terms of its type.

(2-1-2) Utilization Unit

Figure 3:
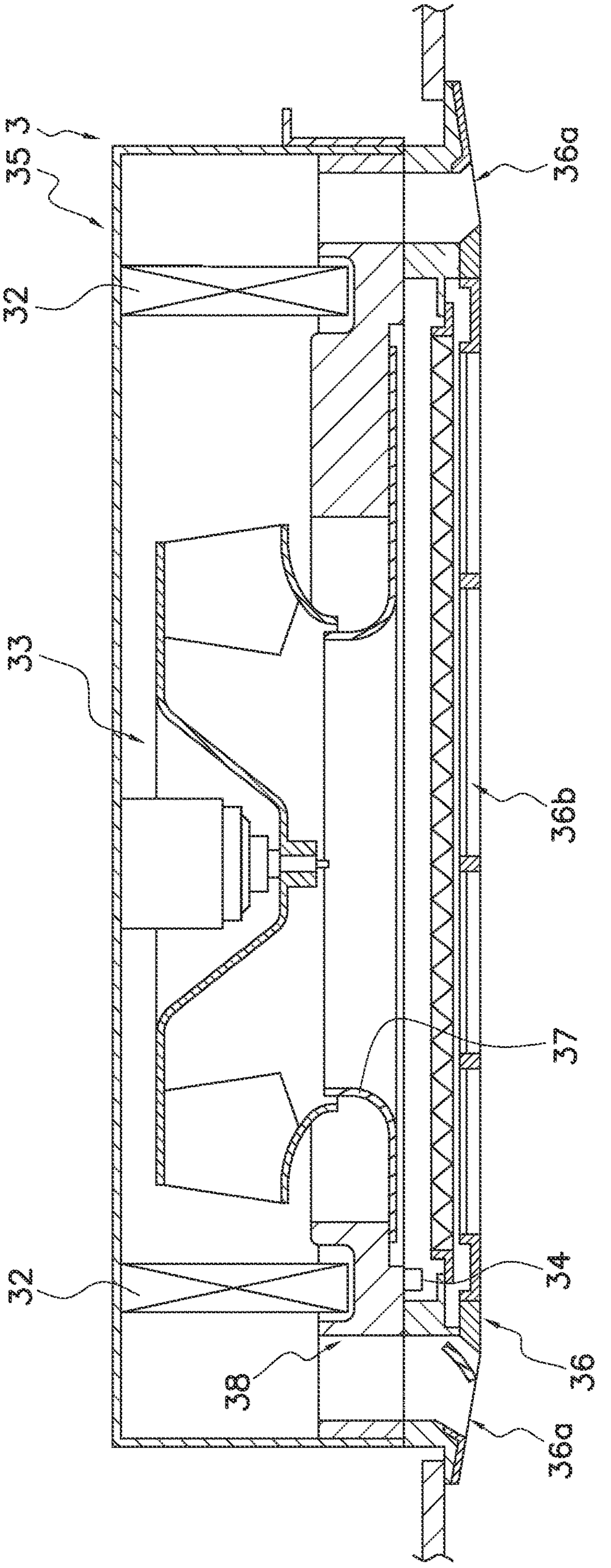
FIG. 3 is a schematic longitudinal sectional view of a utilization unit of the air conditioning system depicted in FIG. 1.

With reference to FIGS. 2 and 3, description is made to an exemplary configuration of the utilization unit 3 other than the utilization control device 44. FIG. 3 is a schematic longitudinal sectional view of the utilization unit 3 of the air conditioning system 100.

The utilization unit 3 is disposed in the air conditioning target space or the like. The utilization unit 3 according to the present embodiment is of a ceiling embedded type. The utilization unit 3 may alternatively be of a ceiling pendant type, a wall mounted type, or a floorstanding type.

Furthermore, the utilization unit 3 may alternatively be disposed outside the air conditioning target space. The utilization unit 3 may be installed in an attic space, a machine chamber, or the like. In such a case, there is disposed an air passage for supply, from the utilization unit 3 to the air conditioning target space, of air having exchanged heat with a refrigerant in the utilization heat exchanger 32. Examples of the air passage include a duct. The air passage should not be limited to the duct but may be appropriately selected in terms of its type.

The utilization unit 3 principally includes a utilization expansion mechanism 31, the utilization heat exchanger 32, a utilization fan 33, and a casing 35 (see FIGS. 2 and 3).

The utilization expansion mechanism 31 is disposed between the heat source heat exchanger 16 and the utilization heat exchanger 32 in the refrigerant circuit 6. The utilization expansion mechanism 31 is disposed on a refrigerant pipe connecting the utilization heat exchanger 32 and the liquid refrigerant connection pipe 4. The utilization expansion mechanism 31 is configured to adjust pressure and a flow rate of a refrigerant flowing in the refrigerant pipe. The utilization expansion mechanism 31 according to the present embodiment is implemented as an electronic expansion valve having a variable opening degree, but should not be limited thereto.

The utilization heat exchanger 32 causes heat exchange between a refrigerant flowing in the utilization heat exchanger 32 and air in the air conditioning target space. The utilization heat exchanger 32 should not be limited in terms of its type, but is exemplified by a fin-and-tube heat exchanger including plural heat transfer tubes and fins (not depicted). The utilization heat exchanger 32 has a first end connected to the liquid refrigerant connection pipe 4 via the refrigerant pipe. The utilization heat exchanger 32 has a second end connected to the gas refrigerant connection pipe 5 via a refrigerant pipe.

The utilization fan 33 is a mechanism configured to suck air in the air conditioning target space into the casing 35 of the utilization unit 3, supply the utilization heat exchanger 32 with the air, and blow, into the air conditioning target space, air having exchanged heat with a refrigerant in the utilization heat exchanger 32. Examples of the utilization fan 33 include a turbo fan. The utilization fan 33 should not be limited to the turbo fan but may be appropriately selected in terms of its type.

The casing 35 accommodates the utilization expansion mechanism 31, the utilization heat exchanger 32, and the utilization fan 33. The casing 35 has a bottom provided with a decorative laminated sheet 36. The casing 35 has an internal center provided with the utilization fan 33. The utilization heat exchanger 32 is disposed so as to surround the utilization fan 33. The utilization heat exchanger 32 is provided therebelow with a drain pan 38 configured to receive condensate water in the utilization heat exchanger 32. A bell mouth 37 is disposed below the utilization fan 33 and is surrounded by the drain pan 38. When the utilization fan 33 operates, air is sucked through a blow-in port **36*b* provided at a center of the decorative laminated sheet 36. The air sucked through the blow-in port 36*b* passes the bell mouth 37 and is sucked into the utilization fan 33 to blow out in four directions. The air blowing in the four directions out of the utilization fan 33 passes the utilization heat exchanger 32 disposed to surround the four sides of the utilization fan 33, and blows out of a blow-out port 36*a* provided in a peripheral edge of the decorative laminated sheet 36**.

(2-1-3) Liquid Refrigerant Connection Pipe and Gas Refrigerant Connection Pipe

The liquid refrigerant connection pipe 4 and the gas refrigerant connection pipe 5 connect the heat source unit 2 and the utilization unit 3. The liquid refrigerant connection pipe 4 and the gas refrigerant connection pipe 5 are constructed onsite.

(2-1-4) Heat Source Control Device

The heat source control device 42 controls various constituents of the heat source unit 2. The heat source control device 42 includes a microcontroller unit (MCU), as well as various electric circuits and electronic circuits (not depicted). The MCU includes a CPU, a memory, an I/O interface, and the like. The memory in the MCU stores various programs to be executed by the CPU in the MCU. Various functions of the heat source control device 42 to be described hereinafter may be achieved by hardware, software, or hardware and software cooperating with each other.

The heat source control device 42 is electrically connected to various constituents of the heat source unit 2, including the compressor 8, the flow direction switching mechanism 10, the heat source expansion mechanism 12, and the heat source fan 15 (see FIG. 2). The heat source control device 42 is electrically connected to a sensor (not depicted) provided at the heat source unit 2. Though not limited, examples of the sensor include a temperature sensor or a pressure sensor provided at the discharge pipe 18 and the suction pipe 17, a temperature sensor provided at the heat source heat exchanger 16, a temperature sensor provided at the liquid refrigerant pipe 20, and a temperature sensor configured to measure temperature of the heat source air.

The heat source control device 42 is connected to the utilization control device 44 by a communication line 46. The heat source control device 42 and the utilization control device 44 transmit and receive, via the communication line 46, control signals for the air conditioner 1. The control signals for the air conditioner 1 are used to control the various constituents of the air conditioner 1.

As depicted in FIG. 1, the heat source control device 42 includes a heat source air conditioning control unit 42*a* as a functional unit configured to control the various constituents of the heat source unit 2. The heat source air conditioning control unit 42*a*, a utilization air conditioning control unit 44*a* of the utilization control device 44, and the control device 48*a* cooperatively function as an air conditioning control unit configured to control behavior of the air conditioner 1. The air conditioning control unit controls behavior of the various constituents of the air conditioner 1 in accordance with a command to the remote controller 48, measurement values of various sensors provided at the heat source unit 2 and the utilization unit 3, and the like.

For example, during cooling operation, the air conditioning control unit controls behavior of the flow direction switching mechanism 10 to switch the refrigerant circuit 6 into the first state where the heat source heat exchanger 16 functions as a refrigerant radiator and the utilization heat exchanger 32 functions as a refrigerant evaporator. During cooling operation, the air conditioning control unit operates the compressor 8, the heat source fan 15, and the utilization fan 33. During cooling operation, the air conditioning control unit adjusts, in accordance with the measurement values of the various sensors, set temperature, and the like, numbers of revolutions of motors of the compressor 8, the heat source fan 15 and the utilization fan 33, and the opening degrees of the electronic expansion valves exemplifying the heat source expansion mechanism 12 and the utilization expansion mechanism 31 to predetermined opening degrees. During heating operation, the air conditioning control unit controls behavior of the flow direction switching mechanism 10 to switch the refrigerant circuit 6 into the second state where the heat source heat exchanger 16 functions as a refrigerant evaporator and the utilization heat exchanger 32 functions as a refrigerant radiator. During heating operation, the air conditioning control unit operates the compressor 8, the heat source fan 15, and the utilization fan 33. During heating operation, the air conditioning control unit adjusts, in accordance with the measurement values of the various sensors, set temperature, and the like, the compressor 8, numbers of revolutions of the motors of the heat source fan 15 and the utilization fan 33, and the opening degrees of the electronic expansion valves exemplifying the heat source expansion mechanism 12 and the utilization expansion mechanism 31 to predetermined opening degrees.

Specific control of behavior of the various constituents of the air conditioner 1 during cooling operation and heating operation has various control manners that are publicly known. Accordingly, description will not be provided herein to avoid complicated description.

When the refrigerant sensor 34 of the refrigerant leakage notifying device 80 detects refrigerant leakage, the heat source air conditioning control unit 42*a* executes leakage control to the various constituents of the heat source unit 2. For example, the leakage control executed by the heat source air conditioning control unit 42*a* may relate to control to inhibit activation of the compressor 8 and the heat source fan 15 in the heat source unit 2 when they are not in operation. Further, the leakage control executed by the heat source air conditioning control unit 42*a* may relate to control to stop the compressor 8 and the heat source fan 15 in the heat source unit 2 when they are in operation. When the compressor 8 and the heat source fan 15 in the heat source unit 2 in operation are stopped to execute the leakage control, the heat source air conditioning control unit 42*a* may stop the compressor 8 and the heat source fan 15 in a manner similar to ordinary air conditioning operation stop. Alternatively, the heat source air conditioning control unit 42*a* may stop the compressor 8 and the heat source fan 15 in a manner different from ordinary air conditioning operation stop.

(2-1-5) Utilization Control Device

The utilization control device 44 includes a microcontroller unit (MCU), as well as various electric circuits and electronic circuits (not depicted). The MCU includes a CPU, a memory, an I/O interface, and the like. The memory in the MCU stores various programs to be executed by the CPU in the MCU. Various functions of the utilization control device 44 to be described hereinafter may be achieved by hardware, software, or hardware and software cooperating with each other. The various functions of the utilization control device 44 to be described hereinafter may alternatively be partially achieved by a control device provided separately from the utilization control device 44. For example, the function as the controller of the refrigerant leakage notifying device 80, which will be described later, may alternatively be achieved by a control device provided separately from the utilization control device 44.

The utilization control device 44 is electrically connected to various constituents of the utilization unit 3, including the utilization expansion mechanism 31 and the utilization fan 33 (see FIG. 2). The utilization control device 44 is electrically connected to a sensor (not depicted) provided at the utilization unit 3. Though not limited, examples of the sensor include a temperature sensor provided at the utilization heat exchanger 32 and a liquid-side refrigerant pipe connected to the utilization heat exchanger 32, and a temperature sensor configured to measure temperature in the air conditioning target space.

The utilization control device 44 is connected to the heat source control device 42 by the communication line 46 as described above. The utilization control device 44 is communicably connected to the remote controller 48 by the communication line 46.

The utilization control device 44 is communicably connected to the refrigerant sensor 34 by a signal line 96. The utilization control device 44 receives, via the signal line 96, a detection signal DS outputted from the refrigerant sensor 34.

The utilization control device 44 includes a storage unit 44*g* serving as a functional unit configured to store various information. The utilization control device 44 includes the utilization air conditioning control unit 44*a* as a functional unit. The utilization control device 44 further includes, as functional units, a notification control unit 44*b*, a determination unit 44*c*, a reception unit 44*d*, an output unit 44*e*, and a decision unit 44*f*, which function as the controller of the refrigerant leakage notifying device 80. The functional units 44*b* to 44*f* will be described later.

The utilization air conditioning control unit 44*a* controls behavior of the various constituents of the utilization unit 3. The utilization air conditioning control unit 44*a*, the heat source air conditioning control unit 42*a*, and the control device 48*a* cooperatively function as an air conditioning control unit configured to control the air conditioner 1. The air conditioning control unit is described earlier and will not be described repeatedly.

When the refrigerant sensor 34 of the refrigerant leakage notifying device 80 detects refrigerant leakage, the utilization air conditioning control unit 44*a* executes leakage control to the various constituents of the utilization unit 3. For example, the leakage control executed by the utilization air conditioning control unit 44*a* may relate to control to inhibit activation of the utilization fan 33 in the utilization unit 3 not in operation. Further, the leakage control executed by the utilization air conditioning control unit 44*a* may relate to control to inhibit activation of the utilization fan 33 in the utilization unit 3 in operation. When the utilization fan 33 in operation is stopped to execute the leakage control, the utilization air conditioning control unit 44*a* may stop the utilization fan 33 in a manner similar to ordinary air conditioning operation stop. Alternatively, the utilization air conditioning control unit 44*a* may stop the utilization fan 33 in a manner different from ordinary air conditioning operation stop.

(2-1-6) Remote Controller

The remote controller 48 exemplifies the operation signal transmitter. The remote controller 48 is provided for operation of the air conditioner 1. The remote controller 48 transmits, to the utilization control device 44, various signals for operation of the air conditioner 1. The remote controller 48 should not be limited in terms of its installation position, but is exemplarily attached to a wall of the air conditioning target space. The remote controller 48 is communicably connected to the utilization control device 44 by the communication line 46.

The remote controller 48 may not be fixed at a predetermined position such as the wall. The remote controller 48 may alternatively be portable and be configured to be wirelessly communicable with the utilization control device 44.

The remote controller 48 includes the control device 48*a* having a microcontroller unit (MCU), as well as various electric circuits and electronic circuits (not depicted). The MCU includes a CPU, a memory, an I/O interface, and the like. The memory in the MCU stores various programs to be executed by the CPU in the MCU. Various functions of the control device 48*a* to be described hereinafter may be achieved by hardware, software, or hardware and software cooperating with each other. The control device 48*a* exemplarily functions as a determination unit 48*a*1 and a transmitter 48*a*2.

The remote controller 48 includes an operation unit 48*d*, a display unit 48*b*, and a speaker 48*c*. The display unit 48*b* and the speaker 48*c* function as a notification unit 70 of the refrigerant leakage notifying device 80.

The operation unit 48*d* is a functional unit provided to allow a person to operate the air conditioner 1 in various manners. The operation unit 48*d* exemplarily includes various switches. The operation unit 48*d* may alternatively include a touch panel provided at a display functioning as the display unit 48*b*. In a case where the air conditioner 1 is a voice-operated device, the operation unit 48*d* may further include a microphone configured to receive a voice command. The operation unit 48*d* may not be operated directly by a person, but may alternatively receive, as operation to the air conditioner 1, a signal transmitted from a mobile terminal such as a smartphone operated by a person.

The remote controller 48 transmits, to the air conditioner 1, various signals in accordance with operation to the operation unit 48*d*. Specifically, when the operation unit 48*d* is operated, the determination unit 48*a*1 in the control device 48*a* determines an operation content received by the operation unit 48*d*. Though not limited, examples of the operation content received by the operation unit 48*d* include starting operation of the air conditioner 1, stopping operation of the air conditioner 1, setting an airflow direction and airflow volume of the utilization unit 3, and setting set temperature of the air conditioner 1. The transmitter 48*a*2 in the control device 48*a* transmits, to the utilization control device 44 via the communication line 46, a signal according to the operation content determined by the determination unit 48*a*1. For example, in a case where the operation content determined by the determination unit 48*a*1 is starting operation of the air conditioner 1, the transmitter 48*a*2 transmits an operation start command signal to the utilization control device 44 via the communication line 46.

The operation unit 48*d* is adopted as a trigger for transmission of an output command signal as a command to the refrigerant leakage notifying device 80 for execution of the test behavior. In the air conditioning system 100, the notification unit 70 executes the test behavior of emitting at least one of sound and light in a case where the remote controller 48 transmits an operation signal C of a predetermined type as a signal for operation of the air conditioner 1 in accordance with operation to the operation unit 48*d*.

Specifically, when the determination unit 48*a*1 determines that the operation received by the operation unit 48*d* is predetermined operation and transmits the operation signal C, the transmitter 48*a*2 also transmits the output command signal for testing the refrigerant leakage notifying device 80 to the utilization control device 44 via the communication line 46. The output command signal causes the output unit 44*e* in the utilization control device 44 to output a test signal TS.

In an exemplary case where the determination unit 48*a*1 determines that the operation received by the operation unit 48*d* is starting operation of the air conditioner 1, the transmitter 48*a*2 transmits, as the operation signal C, the operation start command signal for the air conditioner 1 to the utilization control device 44. On this occasion, the transmitter 48*a*2 transmits the output command signal to the utilization control device 44.

In an exemplary case where the determination unit 48$a$1 determines that the operation received by the operation unit 48$d$ is stopping operation of the air conditioner 1, the transmitter 48$a$2 transmits, as the operation signal C, an operation stop command signal for the air conditioner 1 to the utilization control device 44. On this occasion, the transmitter 48$a$2 transmits the output command signal to the utilization control device 44.

In an exemplary case where the determination unit 48$a$1 determines that the operation received by the operation unit 48$d$ is setting the airflow direction and the airflow volume of the utilization unit 3, setting the set temperature, or the like, the transmitter 48$a$2 transmits, to the utilization control device 44, a signal commanding such setting change as the operation signal C. On this occasion, the transmitter 48$a$2 transmits the output command signal to the utilization control device 44.

In this embodiment, the transmitter 48$a$2 transmits the output command signal to the utilization control device 44 with execution of the operation to the operation unit 48$d$ as a trigger. However, the transmitter 48$a$2 may alternatively transmit the output command signal regardless of the operation to the operation unit 48$d$. For example, in a case where the remote controller 48 is configured to transmit, as the operation signal C, the operation start command signal for the air conditioner 1 at predetermined timing in accordance with a set timer, the transmitter 48$a$2 may transmit the output command signal upon transmission of the operation start command signal.

The display unit 48$b$ displays various setting of the air conditioner 1 and a state of the air conditioning target space. The display unit 48$b$ according to the present embodiment functions also as a notification unit 70 of the refrigerant leakage notifying device 80, and notifies refrigerant leakage by means of light, by lighting or flickering backlight (not depicted). Furthermore, the display unit 48$b$ according to the present embodiment functions also as a display unit of the refrigerant leakage notifying device 80, and displays, by means of a letter or a figure, a content for notifying the refrigerant leakage.

The speaker 48$c$ functions as the notification unit 70 of the refrigerant leakage notifying device 80, and notifies refrigerant leakage by means of sound. The speaker 48$c$ may output sound according to behavior of the air conditioner 1 or operation, in addition to notify the refrigerant leakage by means of sound.

(2-2) Refrigerant Leakage Notifying Device

The refrigerant leakage notifying device 80 is configured to detect a refrigerant by means of the refrigerant sensor 34, and notify refrigerant leakage with at least one of sound and light upon detection of refrigerant leakage.

The refrigerant leakage notifying device 80 principally includes the refrigerant sensor 34, the notification unit 70, the controller, and the remote controller 48. The notification unit 70 according to the present embodiment is incorporated in the remote controller 48. In the present embodiment, part of the utilization control device 44 of the air conditioner 1 functions as the controller. The utilization control device 44 includes, as the functional units of the controller of the refrigerant leakage notifying device 80, the notification control unit 44$b$, the determination unit 44$c$, the reception unit 44$d$, the output unit 44$e$, the decision unit 44$f$, and the storage unit 44$g$.

Schematic description is made initially to behavior of various constituents or functional units of the refrigerant leakage notifying device 80.

The refrigerant leakage notifying device 80 has, as behavior modes, a test behavior mode and a substantial behavior mode. The test behavior mode and the substantial behavior mode are principally different from each other in notification manners of the notification unit 70.

When the refrigerant leakage notifying device 80 behaves in the test behavior mode, the notification unit 70 stops notification by means of sound and light after test behavior mode time t1. The test behavior mode time t1 is exemplified by one second, though not limited thereto. When the refrigerant leakage notifying device 80 behaves in the test behavior mode, the notification unit 70 notifies by means of sound having first volume V1.

When the refrigerant leakage notifying device 80 behaves in the substantial behavior mode, the notification unit 70 continuously notifies by means of sound and light for longer time than the test behavior mode time t1. When the refrigerant leakage notifying device 80 behaves in the substantial behavior mode, the notification unit 70 continuously notifies by means of sound and light until an alarming cancellation switch (not depicted) is operated. However, behavior of the notification unit 70 should not be limited to this. For example, when the refrigerant leakage notifying device 80 behaves in the substantial behavior mode, the notification unit 70 may end notification by means of sound and light after substantial behavior mode time (e.g. ten minutes) longer than the test behavior mode time t1 even if the alarming cancellation switch is not operated. When the refrigerant leakage notifying device 80 behaves in the substantial behavior mode, the notification unit 70 notifies by means of sound having second volume V2. The second volume V2 is larger than the first volume V1.

In the refrigerant leakage notifying device 80, the determination unit 44$c$ determines whether or not the refrigerant leaks in accordance with the detection signal DS (see an arrow for A1 in FIG. 1) outputted from the refrigerant sensor 34. When the determination unit 44$c$ determines that the refrigerant leaks, the notification control unit 44$b$ transmits a substantial behavior control signal to the remote controller 48 to cause the notification unit 70 to execute notification behavior by means of sound and light (see an arrow for A2 in FIG. 1). In this case, the notification unit 70 executes notification behavior which is for the case where the refrigerant leakage notifying device 80 behaves in the substantial behavior mode.

Figure 4:
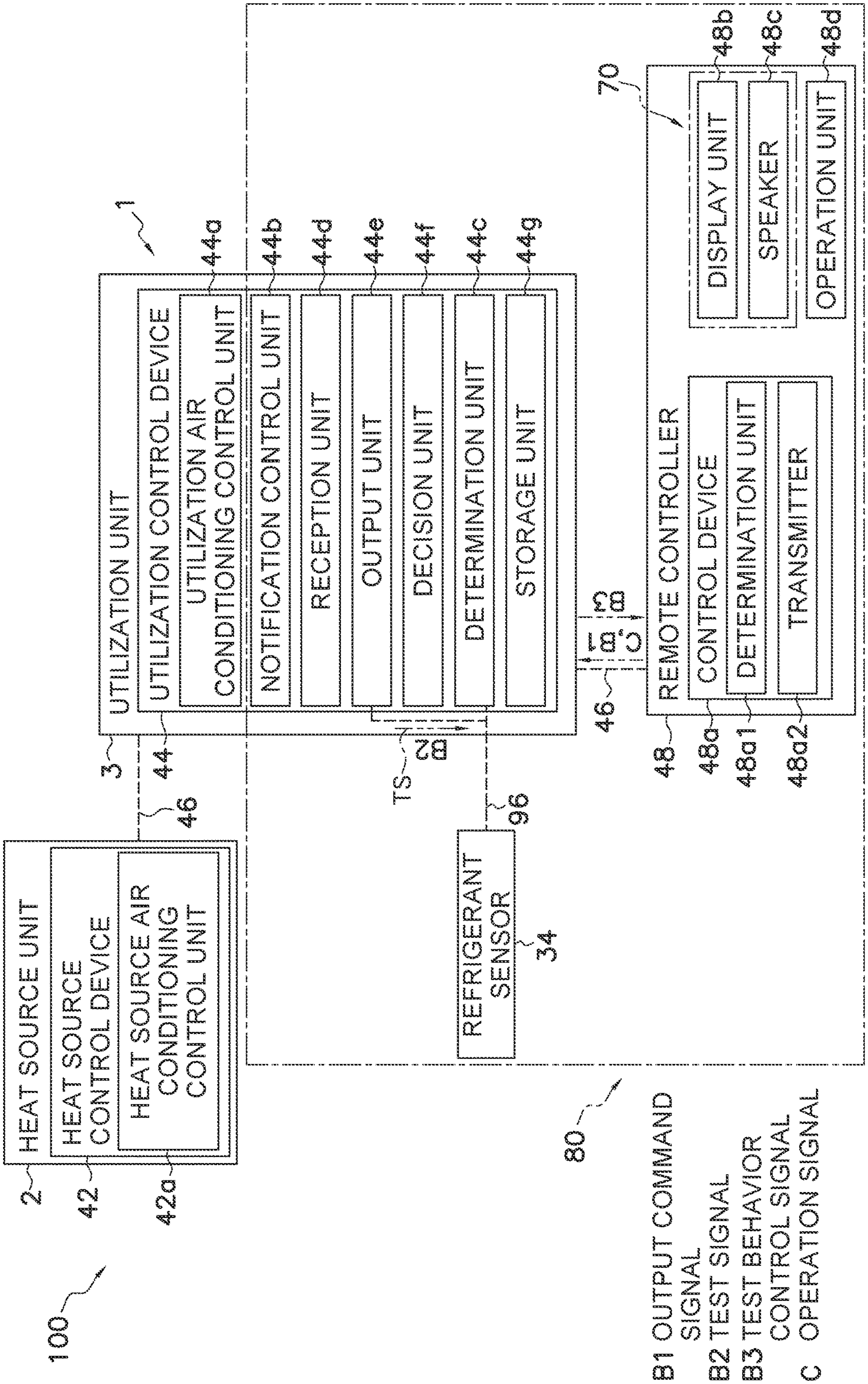
FIG. 4 indicates, by means of arrows, flows of signals upon testing of a leakage notifying circuit in the air conditioning system depicted in FIG. 1.

When the reception unit 44$d$ receives the output command signal transmitted from the remote controller 48 (see an arrow for B1 in FIG. 4), the output unit 44$e$ transmits the test signal TS to the determination unit 44$c$ (see an arrow for B2 in FIG. 4). The determination unit 44$c$ having received the test signal TS as a signal determines that the refrigerant leaks. When the determination unit 44$c$ determines that the refrigerant leaks in accordance with the test signal TS, the notification control unit 44$b$ transmits a test behavior control signal to the remote controller 48 to cause the notification unit 70 to execute notification behavior by means of sound and light (see an arrow for B3 in FIG. 4). In this case, the notification unit 70 executes notification behavior which is for the case where the refrigerant leakage notifying device 80 behaves in the test behavior mode.

In this embodiment, the determination unit 44$c$ does not decide by itself a type of a signal which the determination unit 44$c$ has received and with which the determination unit 44$c$ has determined that the refrigerant leaks. The decision unit 44*f* decides whether the signal, which the determination unit 44*c* has received and with which the determination unit 44*c* has determined that the refrigerant leaks, is the detection signal DS or the test signal TS. Specifically when the determination unit 44*c* determines that the refrigerant leaks, the notification control unit 44*b* transmits either the substantial behavior control signal or the test behavior control signal to the remote controller 48 in accordance with a decision result of the decision unit 44*f* In other words, the refrigerant leakage notifying device 80 behaves in the substantial behavior mode when the determination unit 44*c* determines that the refrigerant leaks and the decision unit 44*f* decides that the signal which the determination unit 44*c* has received and with which the determination unit 44*c* has determined that the refrigerant leaks is the detection signal DS. The refrigerant leakage notifying device 80 behaves in the test behavior mode when the determination unit 44*c* determines that the refrigerant leaks and the decision unit 44*f* decides that the signal which the determination unit 44*c* has received and with which the determination unit 44*c* has determined that the refrigerant leaks is the test signal TS.

The display unit 48*b* displays, by means of a letter or a figure, the notification content for refrigerant leakage when the determination unit 44*c* determines that the refrigerant leaks and the decision unit 44*f* decides that the signal which the determination unit 44*c* has received and with which the determination unit 44*c* has determined that the refrigerant leaks is the detection signal DS. In other words, the display unit 48*b* displays, by means of the letter or the figure, the content for notifying the refrigerant leakage when the refrigerant leakage notifying device 80 behaves in the substantial behavior mode.

The display unit 48*b* may display that the refrigerant leakage notifying device 80 is being tested when the determination unit 44*c* determines that the refrigerant leaks and the decision unit 44*f* decides that the signal which the determination unit 44*c* has received and with which the determination unit 44*c* has determined that the refrigerant leaks is the test signal TS. In other words, the display unit 48*b* may display that the refrigerant leakage notifying device 80 is being tested when the refrigerant leakage notifying device 80 behaves in the test behavior mode.

The refrigerant sensor 34, the notification unit 70, and the controller in the refrigerant leakage notifying device 80 will be described in detail below.

(2-2-1) Refrigerant Sensor

The refrigerant sensor 34 exemplifies the detection unit. The refrigerant sensor 34 is configured to detect a refrigerant. The refrigerant leakage notifying device 80 according to the present embodiment includes the single refrigerant sensor 34. The refrigerant leakage notifying device 80 should not be limited thereto, but may include a plurality of refrigerant sensors 34.

For example, the refrigerant sensor 34 is disposed in the casing 35 of the utilization unit 3. As depicted in FIG. 3, the refrigerant sensor 34 is attached to a bottom surface of the drain pan 38 disposed below the utilization heat exchanger 32. The refrigerant sensor 34 may alternatively be attached to a position other than the drain pan 38, such as a bottom surface of a member connecting the bell mouth 37 and the drain pan 38, a bottom surface of the bell mouth 37, or an inner surface of the casing 35. The refrigerant sensor 34 may still alternatively be disposed outside the casing 35 of the utilization unit 3.

The refrigerant sensor 34 may be of a semiconductor type. The refrigerant sensor 34 of the semiconductor type includes a semiconductor detector element (not depicted). The semiconductor detector element has electric conductivity that changes in accordance with whether there is no ambient refrigerant gas or there is ambient refrigerant gas. In a case where there is the refrigerant gas around the semiconductor detector element, the refrigerant sensor 34 outputs relatively large electric current as the detection signal DS. In a case where there is no refrigerant gas around the semiconductor detector element, the refrigerant sensor 34 outputs relatively small electric current as the detection signal DS.

The refrigerant sensor 34 should not be limited to the semiconductor type, if it can detect refrigerant gas. For example, the refrigerant sensor 34 may be of an infrared type configured to output the detection signal DS in accordance with a refrigerant detection result.

(2-2-2) Notification Unit

The notification unit 70 notifies refrigerant leakage with at least one of sound and light. The notification unit 70 according to the present embodiment is incorporated in the remote controller 48. The notification unit 70 includes the display unit 48*b* configured to emit light and the speaker 48*c* configured to emit sound, to notify refrigerant leakage with both sound and light. In the present embodiment, the display unit 48*b* of the remote controller 48 notifies by means of light. The remote controller 48 may alternatively include a lamp separately from the display unit 48*b* and configured to emit light as the notification unit 70.

When the notification control unit 44*b* transmits the test behavior control signal to the remote controller 48, the notification unit 70 executes notification behavior which is for the case where the refrigerant leakage notifying device 80 behaves in the test behavior mode. When the notification control unit 44*b* transmits the substantial behavior control signal to the remote controller 48, the notification unit 70 executes notification behavior which is for the case where the refrigerant leakage notifying device 80 behaves in the substantial behavior mode.

Figure 5:
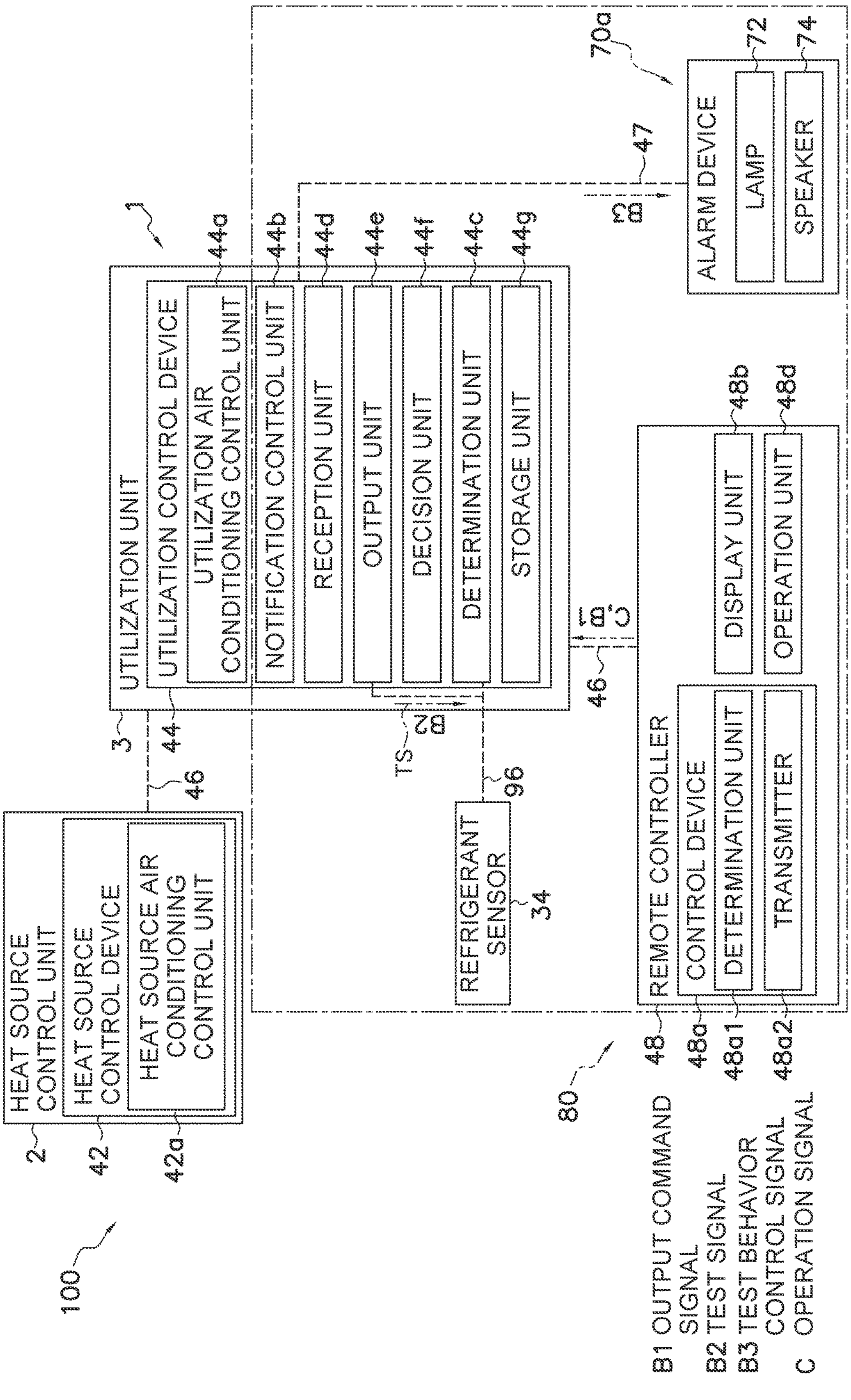
FIG. 5 is a block diagram of an air conditioning system as a refrigeration cycle system according to another example, indicating, by means of arrows, flows of signals upon testing of a leakage notifying circuit.

The notification unit 70 according to the present embodiment is incorporated in the remote controller 48. However, as depicted in FIG. 5, the refrigerant leakage notifying device 80 may alternatively include an alarm device 70*a* functioning as a notification unit and provided independently from the remote controller 48. The alarm device 70*a* includes a lamp 72 and a speaker 74. The alarm device 70*a* is connected to the utilization control device 44 by a signal line 47, and receives the substantial behavior control signal or the test behavior control signal from the notification control unit 44*b* via the signal line 47. The alarm device 70*a* notifies by means of light and sound in accordance with the substantial behavior control signal or the test behavior control signal received. The alarm device 70*a* may be attached to the decorative laminated sheet 36 of the utilization unit 3. The alarm device 70*a* may alternatively be attached to the wall or a ceiling of the air conditioning target space, independently from the air conditioner 1.

(2-2-3) Controller

Detailed description is made to the notification control unit 44*b*, the determination unit 44*c*, the reception unit 44*d*, the output unit 44*e*, and the decision unit 44*f* in the utilization control device 44, which functions as the controller of the refrigerant leakage notifying device 80.

(2-2-3-1) Notification Control Unit

The notification control unit 44*b* controls behavior of the notification unit 70. The notification control unit 44*b* exemplifies the processing unit. The notification control unit 44*b* causes the notification unit 70 to execute test behavior of emitting at least one of sound and light when the remote controller 48 transmits the operation signal C for the air conditioner 1.

When the determination unit 44*c* determines that the refrigerant leaks and the decision unit 44*f* decides that the signal received by the determination unit 44*c* is the detection signal DS, the notification control unit 44*b* transmits the substantial behavior control signal to the remote controller 48 (see FIG. 1). In other words, the notification control unit 44*b* causes the notification unit 70 to behave in the manner for the case where the refrigerant leakage notifying device 80 behaves in the substantial behavior mode when the determination unit 44*c* determines that the refrigerant leaks and the decision unit 44*f* decides that the signal received by the determination unit 44*c* is the detection signal DS.

When the determination unit 44*c* determines that the refrigerant leaks and the decision unit 44*f* decides that the signal received by the determination unit 44*c* is the test signal TS, the notification control unit 44*b* transmits the test behavior control signal to the remote controller 48 (see FIG. 4). In other words, the notification control unit 44*b* causes the notification unit 70 to behave in the manner for the case where the refrigerant leakage notifying device 80 behaves in the test behavior mode when the determination unit 44*c* determines that the refrigerant leaks and the decision unit 44*f* decides that the signal received by the determination unit 44*c* is the test signal TS. The test signal TS is outputted to the determination unit 44*c* in a case where the remote controller 48 transmits the operation signal C for the air conditioner 1. In other words, the notification control unit 44*b* causes the notification unit 70 to execute the test behavior in a case where the remote controller 48 transmits the operation signal C for the air conditioner 1.

(2-2-3-2) Determination Unit

The determination unit 44*c* is a functional unit configured to determine refrigerant leakage in accordance with a received signal. For example, in a case where the refrigerant sensor 34 is of the semiconductor type, the determination unit 44*c* determines that the refrigerant leaks if the received signal has an electric current value exceeding a reference value.

When the detection signal DS received by the determination unit 44*c* has an electric current value exceeding the reference value, the determination unit 44*c* determines that the refrigerant leaks.

When the test signal TS outputted from the output unit 44*e* is inputted, the determination unit 44*c* determines that the refrigerant leaks. This is because the test signal TS has an electric current value exceeding the reference value. In other words, the test signal TS corresponds to the detection signal DS outputted from the refrigerant sensor 34 upon refrigerant leakage. The test signal TS is inputted to an electric circuit connecting the refrigerant sensor 34 and the determination unit 44*c*.

When the determination unit 44*c* determines that the refrigerant is leaks, the determination unit 44*c* notifies the notification control unit 44*b* and the decision unit 44*f* that it is determined that the refrigerant leaks.

(2-2-3-3) Reception Unit

The reception unit 44*d* receives the output command signal which the remote controller 48 transmits, via the communication line 46, when the operation unit 48*d* receives the predetermined operation for control of behavior of the air conditioner 1.

(2-2-3-4) Output Unit

The output unit 44*e* outputs the test signal TS to the electric circuit connecting the refrigerant sensor 34 and the determination unit 44*c* so that the determination unit 44*c* receives the test signal TS. When the reception unit 44*d* receives the output command signal, the output unit 44*e* outputs the test signal TS having an electric current value larger than the reference value as described above.

(2-2-3-5) Decision Unit

The decision unit 44*f* decides whether the signal received by the determination unit 44*c* is the detection signal DS or the test signal TS. In this context, the signal received by the determination unit 44*c* means a signal that the determination unit 44*c* has received and with which the determination unit 44*c* has determined that the refrigerant leaks. In short, when the determination unit 44*c* determines that the refrigerant leaks, the decision unit 44*f* decides whether the signal received by the determination unit 44*c* is the detection signal DS or the test signal TS.

Decision of the decision unit 44*f* is made in accordance with a decision method 1 or a decision method 2 exemplified below. Described herein are merely exemplary decision methods of the decision unit 44*f*, and any other decision method may alternatively be adopted.

Decision Method 1

According to the decision method 1, in a case where the output unit 44*e* outputs the test signal TS within the first period before the determination unit 44*c* receives a signal, the decision unit 44*f* decides that the signal received by the determination unit 44*c* is the test signal TS. When the output unit 44*e* does not output the test signal TS within the first period before the determination unit 44*c* receives a signal, the decision unit 44*f* decides that the signal received by the determination unit 44*c* is the detection signal DS. The first period may be preliminarily stored in the storage unit 44*g* in the utilization control device 44, or may be settable by a manager or the like of the refrigerant leakage notifying device 80. The first period exemplarily has five seconds, though not limited thereto.

In other words, according to the decision method 1, the decision unit 44*f* decides that a signal received by the determination unit 44*c* within the first period after the output unit 44*e* outputs the test signal TS is the test signal TS. The decision unit 44*f* decides that any signal other than the signal received by the determination unit 44*c* within the first period after the output unit 44*e* outputs the test signal TS is the detection signal DS.

Figure 6A:
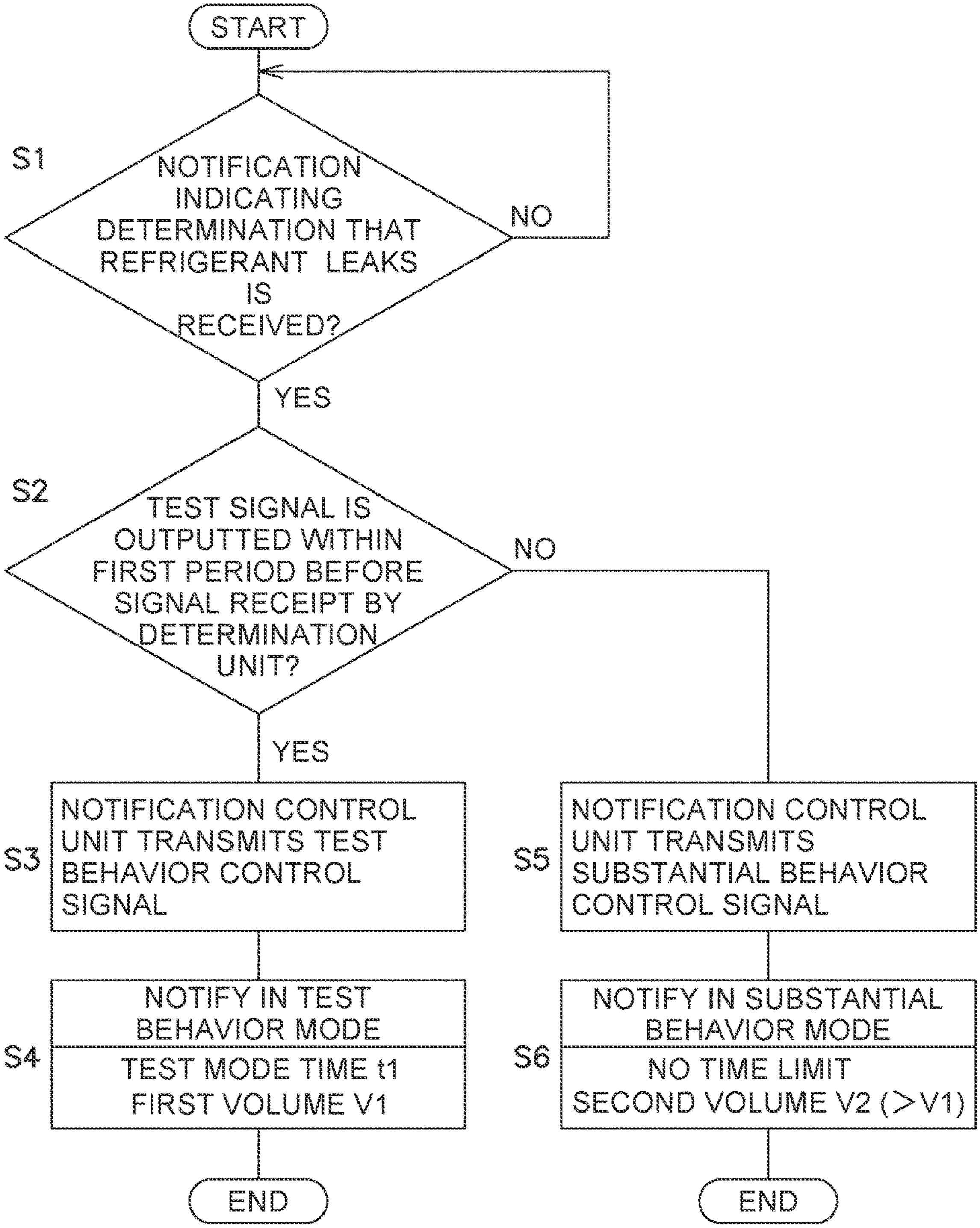
FIG. 6A is an exemplary flowchart depicting behavior of the refrigerant leakage notifying device upon receipt of a signal by an determination unit in the refrigerant leakage notifying device in the air conditioning system depicted in FIG. 1.

With reference to a flowchart in FIG. 6A, description is made to behavior of the refrigerant leakage notifying device 80 in the case where the decision unit 44*f* decides in accordance with the decision method 1.

The description assumes that the decision unit 44*f* detects timing of outputting the test signal TS by the output unit 44*e* and acquires time elapsed from the timing. Processing in step S1 is repeated until the decision unit 44*f* receives the notification transmitted from the determination unit 44*c* and indicating determination that the refrigerant leaks.

Step S1 of the flowchart in FIG. 6A includes determination as to whether or not the decision unit 44*f* has received a notification transmitted from the determination unit 44*c* and indicating determination that the refrigerant leaks. If the decision unit 44*f* receives the notification transmitted from the determination unit 44*c* and indicating determination that the refrigerant leaks (YES in step S1), the flow proceeds to step S2. Processing in step S1 is repeated until the decision unit 44*f* receives the notification transmitted from the determination unit 44*c* and indicating determination that the refrigerant leaks.

In step S2, the decision unit 44*f* decides whether or not time after the output unit 44*e* outputs the test signal TS until the determination unit 44*c* receives a signal is within the first period.

In a case where the time after the output unit 44*e* outputs the test signal TS until the determination unit 44*c* receives a signal is within the first period, the decision unit 44*f* decides that the signal received by the determination unit 44*c* is the test signal TS. The flow then proceeds to step S3.

In a case where the time after the output unit 44*e* outputs the test signal TS until the determination unit 44*c* receives a signal is not within the first period, the decision unit 44*f* decides that the signal received by the determination unit 44*c* is the detection signal DS. If the output unit 44*e* does not recently output the test signal TS, the decision unit 44*f* decides that the time after the output unit 44*e* outputs the test signal TS until the determination unit 44*c* receives a signal is not within the first period, and decides that the signal received by the determination unit 44*c* is the detection signal DS. The flow then proceeds to step S5.

The decision unit 44*f* may alternatively decide as follows in step S2 in another mode. In this mode, the decision unit 44*f* acquires time after the output unit 44*e* outputs the test signal TS until the determination unit 44*c* determines that the refrigerant leaks and outputs a signal notifying refrigerant leakage, and decides that the signal received by the determination unit 44*c* is the test signal TS if the time acquired is shorter than predetermined time. If the time after the output unit 44*e* outputs the test signal TS until the determination unit 44*c* notifies determination that the refrigerant leaks is longer than the predetermined time, the decision unit 44*f* decides that the signal received by the determination unit 44*c* is the detection signal DS. When the output unit 44*e* does not recently output the test signal TS, the decision unit 44*f* decides that the time after the output unit 44*e* outputs the test signal TS until the determination unit 44*c* notifies determination that the refrigerant leaks is longer than the predetermined time, and decides that the signal received by the determination unit 44*c* is the detection signal DS. The predetermined time may be decided in consideration of the first period and time necessary for determination of refrigerant leakage by the determination unit 44*c*. If the time necessary for determination of refrigerant leakage by the determination unit 44*c* is much shorter than the first period, such time necessary for determination of refrigerant leakage by the determination unit 44*c* may be ignored.

Description is made again to behavior of the refrigerant leakage notifying device 80.

In step S3, the notification control unit 44*b* transmits the test behavior control signal to the remote controller 48 including the notification unit 70 via the communication line 46. The notification unit 70 receives the test behavior control signal and executes notification behavior in the manner for the case where the refrigerant leakage notifying device 80 behaves in the test behavior mode (step S4). In other words, the notification unit 70 lights or flickers the display unit 48*b* and causes the speaker 48*c* to emit alarm sound for the test behavior mode time t1. The speaker 48*c* of the notification unit 70 emits alarm sound having the first volume V1 in this case.

In step S5, the notification control unit 44*b* transmits the substantial behavior control signal to the remote controller 48 including the notification unit 70. The notification unit 70 receives the substantial behavior control signal and executes notification behavior in the manner for the case where the refrigerant leakage notifying device 80 behaves in the substantial behavior mode (step S6). In other words, the notification unit 70 lights or flickers the display unit 48*b* and causes the speaker 48*c* to emit alarm sound until the alarming cancellation switch (not depicted) is operated. In this case, the speaker 48*c* of the notification unit 70 emits alarm sound having the second volume V2 larger than the first volume V1.

Decision Method 2

According to the decision method 2, the decision unit 44*f* decides that a signal received by the determination unit 44*c* within the second period after the reception unit 44*d* receives an output command is the test signal TS. The decision unit 44*f* decides that any signal other than signals received by the determination unit 44*c* within the second period after the reception unit 44*d* receives the output command is the detection signal DS. The second period may be preliminarily stored in the storage unit 44*g* in the utilization control device 44, or may be settable by a manager or the like of the refrigerant leakage notifying device 80. The second period exemplarily has five seconds, though not limited thereto.

Figure 6B:
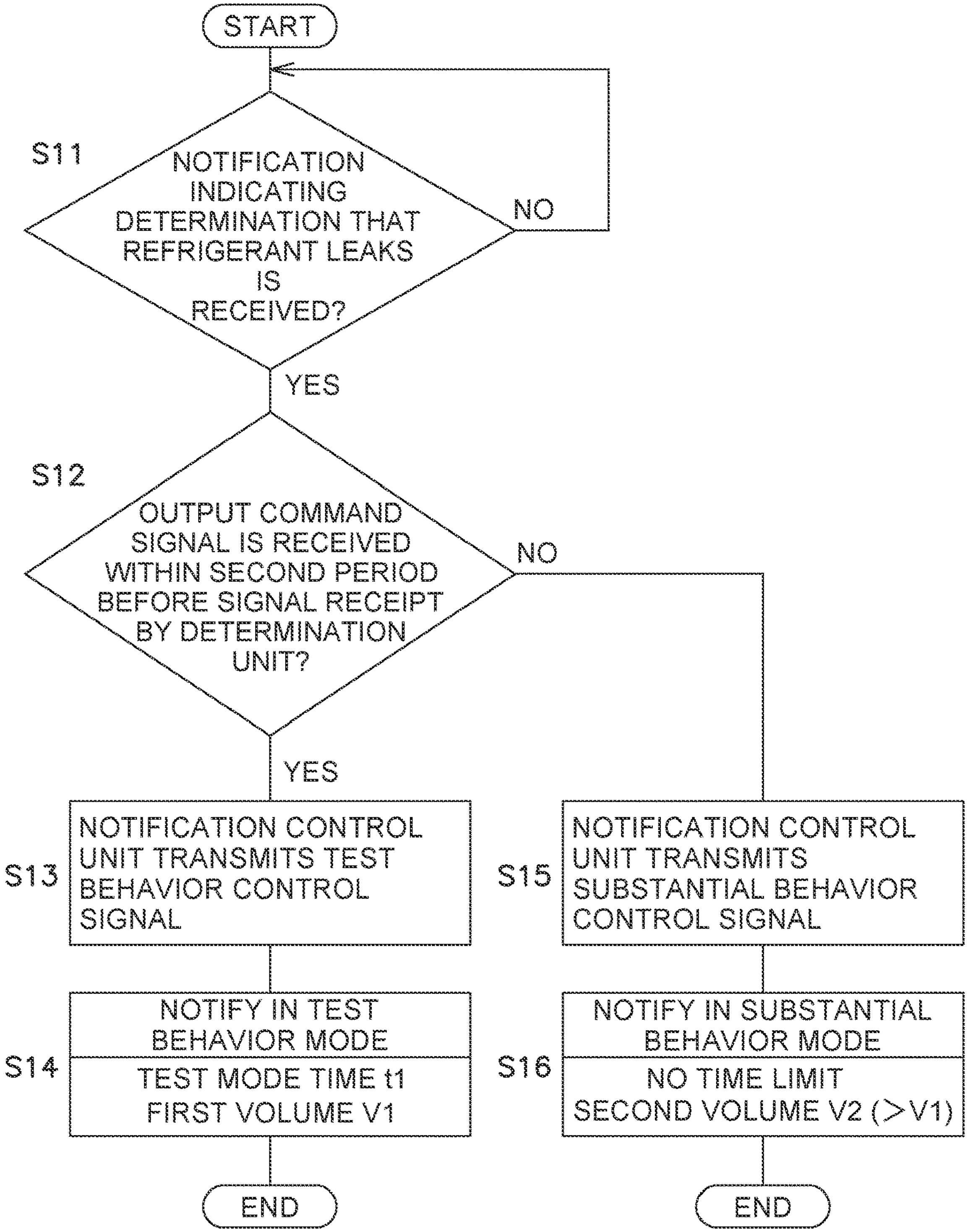
FIG. 6B is another exemplary flowchart depicting behavior of the refrigerant leakage notifying device upon receipt of a signal by the determination unit in the refrigerant leakage notifying device in the air conditioning system depicted in FIG. 1.

With reference to a flowchart in FIG. 6B, description is made to behavior of the refrigerant leakage notifying device 80 in the case where the decision unit 44*f* decides in accordance with the decision method 2.

The description assumes that the decision unit 44*f* detects timing of receiving the output command signal by the reception unit 44*d* and acquires time elapsed from the timing.

Step S11 of the flowchart in FIG. 6B includes determination as to whether or not the decision unit 44*f* has received a notification transmitted from the determination unit 44*c* and indicating determination that the refrigerant leaks. If the decision unit 44*f* receives the notification transmitted from the determination unit 44*c* and indicating determination that the refrigerant leaks (YES in step S11), the flow proceeds to step S12. Processing in step S11 is repeated until the decision unit 44*f* receives the notification transmitted from the determination unit 44*c* and indicating determination that the refrigerant leaks.

In step S12, the decision unit 44*f* decides whether or not time after the reception unit 44*d* receives the output command signal until the determination unit 44*c* receives a signal is within the second period.

In a case where the time after the reception unit 44*d* receives the output command signal until the determination unit 44*c* receives a signal is within the second period, the decision unit 44*f* decides that the signal received by the determination unit 44*c* is the test signal TS. The flow then proceeds to step S13.

In a case where the time after the reception unit 44*d* receives the output command signal until the determination unit 44*c* receives a signal is not within the second period, the decision unit 44*f* decides that the signal received by the determination unit 44*c* is the detection signal DS. The flow then proceeds to step S15.

Processing from step S13 to step S16 is similar to processing from step S3 to step S6 of the flowchart in FIG. 6A, respectively, and will not be described below.

(3) CHARACTERISTICS

3-1

The air conditioning system 100 according to the present embodiment includes the air conditioner 1, the remote controller 48, the refrigerant sensor 34, the notification unit 70, and the notification control unit 44*b*. The air conditioning system 100 exemplifies the refrigeration cycle system. The air conditioner 1 exemplifies a refrigeration cycle apparatus. The remote controller 48 is exemplifies the operation signal transmitter. The refrigerant sensor 34 exemplifies the detection unit. The notification control unit 44*b* exemplifies the processing unit. The air conditioner 1 includes the refrigerant circuit 6. The remote controller 48 transmits the operation signal C to the air conditioner 1. The refrigerant sensor 34 detects leakage of a refrigerant. The notification unit 70 notifies leakage of the refrigerant by emitting at least one of sound and light in a case where the refrigerant sensor 34 detects leakage of the refrigerant. The notification control unit 44*b* causes the notification unit 70 to execute test behavior of emitting at least one of sound and light in a case where the remote controller 48 transmits the operation signal C to the air conditioner 1.

The air conditioning system 100 according to the present embodiment achieves behavior inspection of the notification unit 70 upon transmission of the operation signal C to the air conditioner 1. This configuration enables behavior inspection of the notification unit 70 without specific operation on purpose by a manager of the air conditioning system 100 and thus can reduce time and effort for management of the air conditioning system 100.

In the air conditioning system 100 according to the present embodiment, behavior of the notification unit 70 is inspected when the air conditioner 1 is operated with use of the remote controller 48. This configuration enables inspection, on a daily basis, as to whether or not the notification unit 70 behaves correctly and thus can reduce malfunction of the notification unit 70 upon actual refrigerant leakage.

3-2

In the air conditioning system 100 according to the present embodiment, the remote controller 48 includes the notification unit 70.

In the air conditioning system 100 according to the present embodiment, it is possible to check at hand, whether or not the notification unit 70 behaves correctly when operation to the air conditioner 1 is transmitted from the remote controller 48. Therefore, it is easy to perform the behavior inspection of the notification unit 70.

3-3

In the air conditioning system 100 according to the present embodiment, the operation signal C corresponds to at least one of an activation signal for the air conditioner 1 and a stop signal for the air conditioner 1.

The air conditioning system 100 according to the present embodiment enables inspection, on a daily basis, as to whether or not the notification unit 70 behaves correctly and thus can reduce malfunction of the notification unit 70 upon actual refrigerant leakage.

3-4

In the air conditioning system 100 according to the present embodiment, time for which the notification unit 70 emits at least one of sound and light during the test behavior is shorter than time for which the notification unit 70 emits at least one of sound and light in a case where the refrigerant sensor 34 detects leakage of the refrigerant.

The air conditioning system 100 according to the present embodiment has differences in behavior time of the notification unit 70 between the test behavior and substantial behavior of notifying actual refrigerant leakage. This configuration thus can reduces possibility that users of the air conditioning system 100 make misinterpretation between inspection of the notification unit 70 and actual refrigerant leakage.

In the air conditioning system 100 according to the present embodiment, as the notification unit 70 ends notification in short time upon testing, it is possible to reduce discomfort of the users of the air conditioning system 100 due to sound and light emitted from the notification unit 70.

3-5

In the air conditioning system 100 according to the present embodiment, the notification unit 70 notifies with sound. Volume of sound emitted by the notification unit 70 during the test behavior is smaller than volume of sound emitted by the notification unit 70 in a case where the refrigerant sensor 34 detects leakage of the refrigerant.

The air conditioning system 100 according to the present embodiment has differences in volume of alarm sound between the test behavior and substantial behavior of notifying actual refrigerant leakage. This configuration reduces that users of the air conditioning system 100 make misinterpretation between actual refrigerant leakage and behavior inspection of the notification unit 70.

In the air conditioning system 100 according to the present embodiment, as the notification unit 70 emits sound having smaller volume upon testing, it is possible to reduce discomfort of the users of the air conditioning system 100 due to sound emitted from the notification unit 70.

3-6

The air conditioning system 100 according to the present embodiment includes the determination unit 44*c* and the output unit 44*e*. The determination unit 44*c* receives the detection signal DS outputted from the refrigerant sensor 34 according to a detection result of the refrigerant and determines leakage of the refrigerant in accordance with the detection signal DS received. The output unit 44*e* outputs the test signal TS to the determination unit 44*c* in a case where the remote controller 48 transmits the operation signal C for the air conditioner 1. The output unit 44*e* is provided separately from the refrigerant sensor 34. The test signal TS is a signal which the determination unit 44*c* determines that the refrigerant leaks in a case where the determination unit 44*c* receives the signal. The notification control unit 44*b* causes the notification unit 70 to execute the test behavior in a case where the determination unit 44*c* determines leakage of the refrigerant in accordance with the test signal TS.

The air conditioning system 100 according to the present embodiment achieves inspection as to whether or not the notification unit 70 behaves as well as comprehensive inspection of the leakage notifying circuit including the determination unit 44*c* and the notification unit 70. This configuration achieves high reliability of the air conditioning system 100 in terms of notification of refrigerant leakage.

3-7

In the air conditioning system 100 according to the present embodiment, the refrigerant is flammable.

In the air conditioning system 100 according to the present embodiment, the notification unit 70 is frequently inspected to achieve high reliability in terms of notification of refrigerant leakage. The refrigeration cycle system thus achieves high safety even when a flammable refrigerant is adopted.

(4) MODIFICATION EXAMPLES

Modification examples of the above embodiment will be provided hereinafter. Part or entirety of one of the modification examples may be combined with part or entirety of a different one of the modification examples unless there is no inconsistency.

(4-1) Modification Example A

In the above embodiment, the output unit 44*e* outputs the test signal TS to the determination unit 44*c*, and the notification control unit 44*b* causes the notification unit 70 to execute the test behavior in a case where the determination unit 44*c* determines refrigerant leakage.

Figure 7:
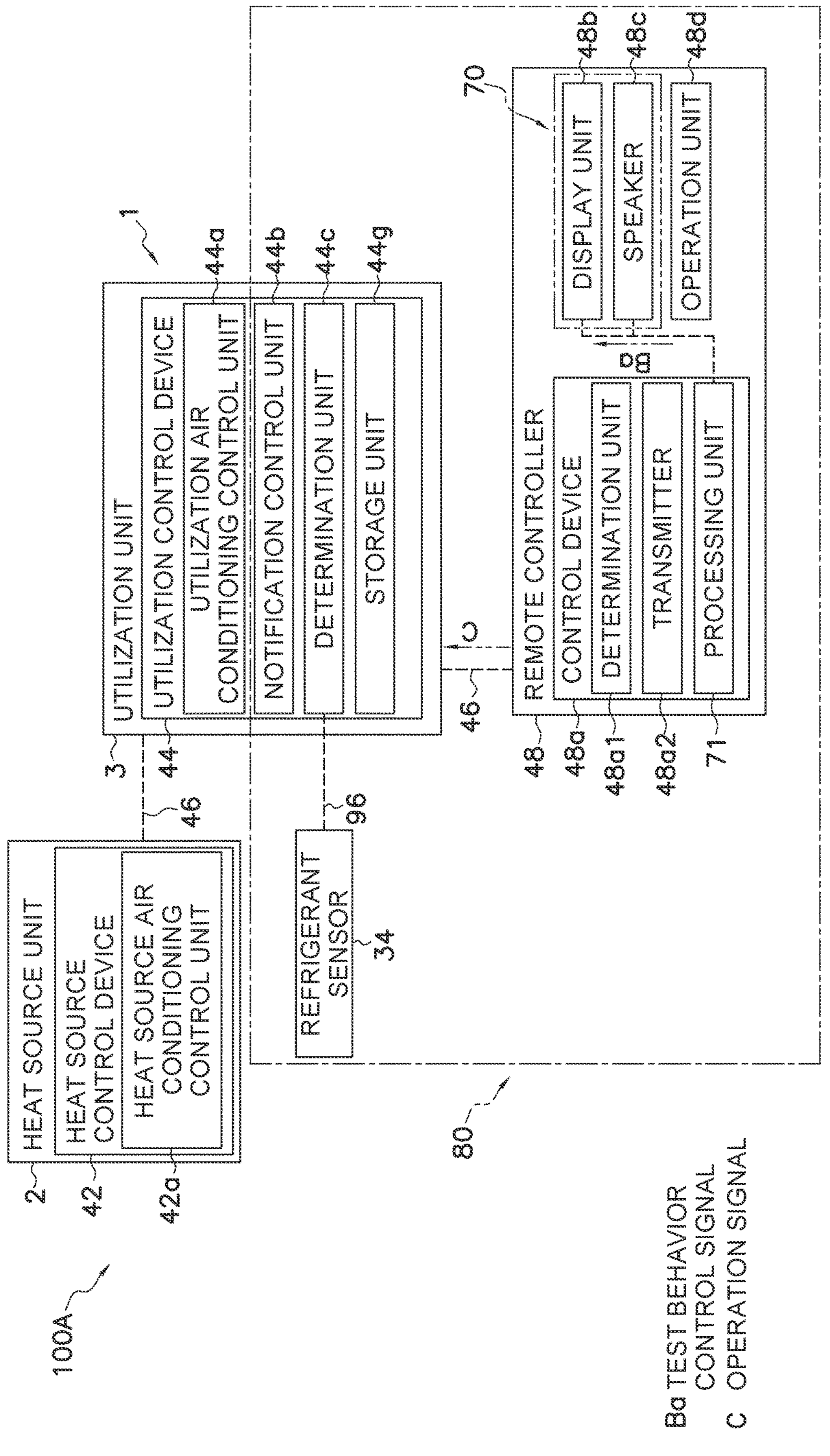
FIG. 7 is a block diagram of an air conditioning system according to a modification example A.

Alternatively, there may be provided an air conditioning system 100A as exemplarily depicted in FIG. 7. Description is made to differences from the air conditioning system 100 depicted in FIG. 4.

The air conditioning system 100A does not include the reception unit 44*d*, the output unit 44*e*, or the decision unit 44*f*.

The determination unit 44*c* in the air conditioning system 100A determines refrigerant leakage in accordance with the detection signal DS from the refrigerant sensor 34 in a manner similar to determination by the determination unit 44*c* in the air conditioning system 100 according to the above embodiment. Unlike the air conditioning system 100 according to the above embodiment, the determination unit 44*c* in the air conditioning system 100A does not receive the test signal TS according to the above embodiment.

Similar to the above embodiment, the notification control unit 44*b* in the air conditioning system 100A controls behavior of the notification unit 70 incorporated in the remote controller 48 such that the notification unit 70 notifies refrigerant leakage with light and sound in a case where the refrigerant sensor 34 detects refrigerant leakage. Unlike the air conditioning system 100 according to the above embodiment, the determination unit 44*c* in the air conditioning system 100A does not receive the test signal TS, and the notification control unit 44*b* does not control behavior of the notification unit 70 when causing the notification unit 70 to execute the test behavior.

The air conditioning system 100A is different from the air conditioning system according to the above embodiment, in that the remote controller 48 includes a processing unit 71. The processing unit 71 transmits a test behavior control signal Ba to the notification unit 70 in a case where the transmitter 48*a*2 transmits the operation signal C to the utilization control device 44 in accordance with a determination result by the determination unit 48*a*1 on the operation content to the operation unit 48*d*. In other words, the processing unit 71 transmits the test behavior control signal Ba to the notification unit 70 in a case where the determination unit 48*a*1 determines that operation to the operation unit 48*d* is the predetermined operation. The notification unit 70 having received the test behavior control signal Ba behaves similarly to the behavior in the test behavior mode according to the above embodiment.

In the air conditioning system 100A, the determination unit 44*c* does not receive the test signal TS. Accordingly, comprehensive inspection of the leakage notifying circuit including the determination unit 44*c* and the notification unit 70 is not executed upon inspection on notification of refrigerant leakage. In the air conditioning system 100A, behavior inspection on lighting or flickering the backlight of the display unit 48*b* and on sound output from the speaker 74 is executed when the remote controller 48 transmits the operation signal C.

(4-2) Modification Example B

The notification unit 70 may include only one of the display unit 48*b* and the speaker 48*c* as a unit configured to notify refrigerant leakage. The notification unit 70 may further include a refrigerant leakage notification unit such as a vibrator, in addition to the display unit 48*b* and the speaker 48*c*.

(4-3) Modification Example C

The operation signal transmitter should not be limited to the remote controller 48 that is directly operated by a person. The operation signal transmitter may alternatively be implemented as a signal transmitter configured to transmit various signals to the air conditioner 1 upon receipt of commands from an external device.

For example, the operation signal transmitter is communicably connected wiredly or wirelessly to a mobile terminal or an equipment management device. The operation signal transmitter is configured to transmit various signals including the operation signal C, to the air conditioner 1 upon receipt of commands from the mobile terminal or the equipment management device. When the operation signal transmitter transmits the operation signal C to the air conditioner 1, the operation signal transmitter may transmit the output command signal to the reception unit 44*d* similarly to the remote controller 48 according to the above embodiment.

(4-4) Modification Example D

The refrigerant leakage notifying device 80 according to the above embodiment has the two behavior modes, though not limited thereto. For example, the refrigerant leakage notifying device 80 may have a single behavior mode, and may cause the notification unit 70 to execute identical notification behavior in a case where the determination unit 44*c* determines that the refrigerant leaks regardless of the type of the signal inputted to the determination unit 44*c*. However, when the refrigerant leakage notifying device 80 has the substantial behavior mode and the test behavior mode, it can reduce possibility of misinterpretation of testing as refrigerant leakage.

(4-5) Modification Example E

In the above embodiment, the remote controller 48 transmits the output command signal to the utilization control device 44, and the output unit 44*e* of the utilization control device 44 outputs the test signal TS.

Figure 8:
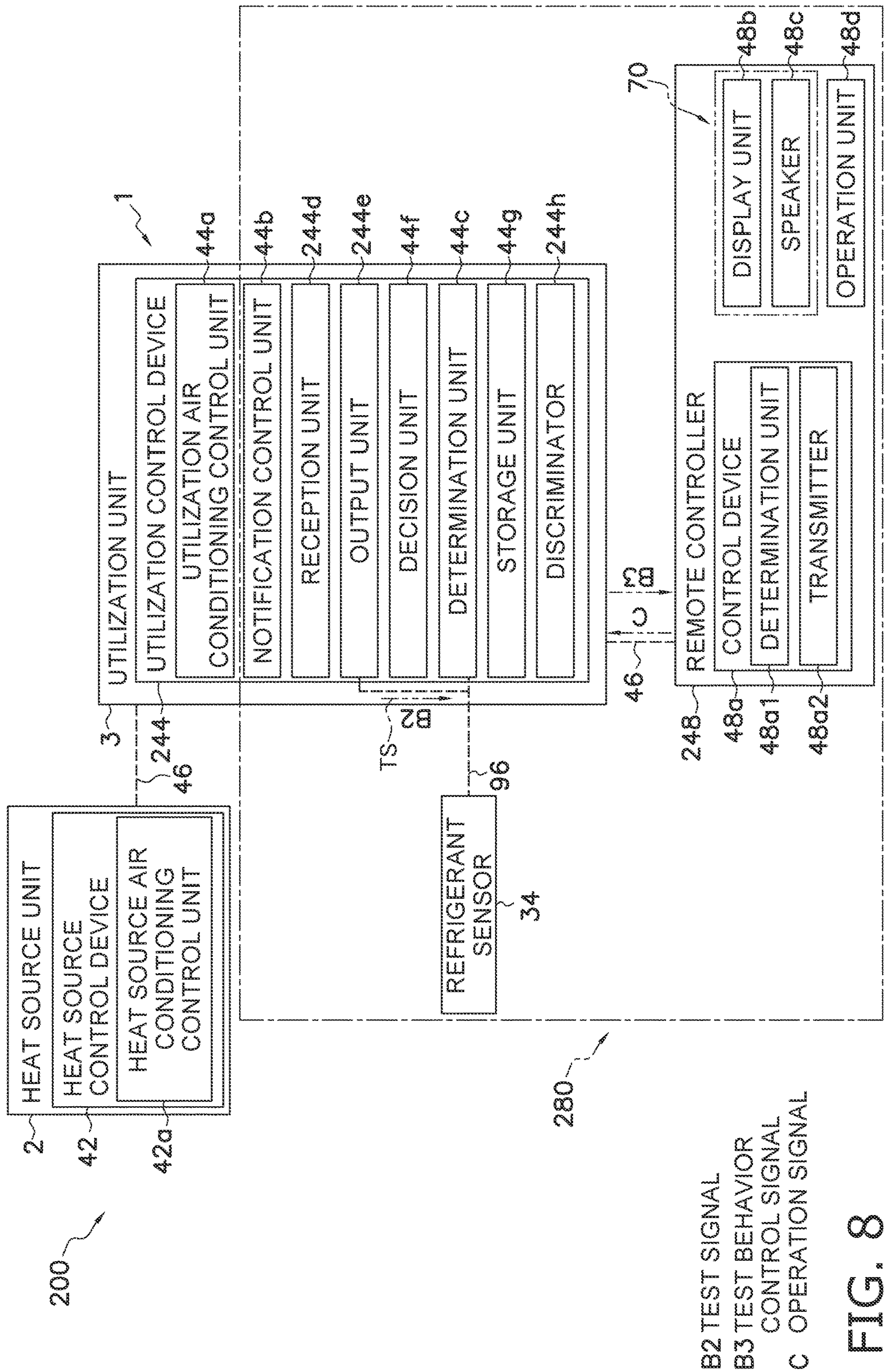
FIG. 8 is a block diagram of an air conditioning system according to a modification example E, indicating, by means of arrows, flows of signals upon testing of a leakage notifying circuit in a refrigerant leakage notifying device.

The air conditioning system and the refrigerant leakage notifying device may alternatively be configured as an air conditioning system 200 and a refrigerant leakage notifying device 280 as exemplarily depicted in FIG. 8. Description is made mainly to differences of the air conditioning system 200 and the refrigerant leakage notifying device 280 from the air conditioning system 100 and the refrigerant leakage notifying device 80, and similar characteristics will not be described below. The following description includes identical reference signs for constituents similar to those according to the above embodiment.

The air conditioning system 200 and the refrigerant leakage notifying device 280 are different from the air conditioning system 100 and the refrigerant leakage notifying device 80 according to the above embodiment in some of functions of a remote controller 248 and some of functions of a utilization control device 244.

The remote controller 248 does not transmit output command signal to the utilization control device 244. The remote controller 248 transmits, to the utilization control device 244, mainly a signal for control of the air conditioner 1. Examples of the signal for control of the air conditioner 1 include the operation signal C. The operation signal C includes at least one of the operation start command signal for the air conditioner 1, the operation stop command signal for the air conditioner 1, and setting change signals relevant to the airflow direction and the airflow volume of the utilization unit 3 and the set temperature of the air conditioner 1. The operation signal C may alternatively be a signal for control of the air conditioner 1 other than the above.

The utilization control device 244 includes a reception unit 244*d* different in terms of functions from the reception unit 44*d* in the utilization control device 44 according to the above embodiment. Specifically, the reception unit 244*d* receives various operation signals for control of the air conditioner 1.

The utilization control device 244 is different from the utilization control device 44 in including a discriminator 244*h*. The discriminator 244*h* discriminates the various signals for control of the air conditioner 1 received by the reception unit 244*d* from the remote controller 248. The discriminator 244*h* functions as part of the air conditioning control unit of the air conditioner 1, and notifies the utilization air conditioning control unit 44*a* that a signal for control of the air conditioner 1 of a type discriminated is transmitted from the remote controller 248. The air conditioning control unit of the air conditioner 1 controls behavior of various parts in the air conditioner 1 in accordance with a notification from the discriminator 244*h*.

The utilization control device 244 includes an output unit 244*e* partially different in terms of behavior from the output unit 44*e* in the utilization control device 44 according to the above embodiment. Specifically, the output unit 44*e* according to the above embodiment outputs the test signal TS when the reception unit 44*d* receives the output command signal, whereas the output unit 244*e* transmits the output command signal for the test signal TS when the discriminator 244*h* discriminates that the signal for control of the air conditioner 1 received by the reception unit 244*d* from the remote controller 248 is the operation signal C of the predetermined type.

(4-6) Modification Example F

According to the above embodiment, the remote controller 48 transmits the output command signal to the utilization control device 44, and the output unit 44*e* outputs the test signal TS.

Figure 9:
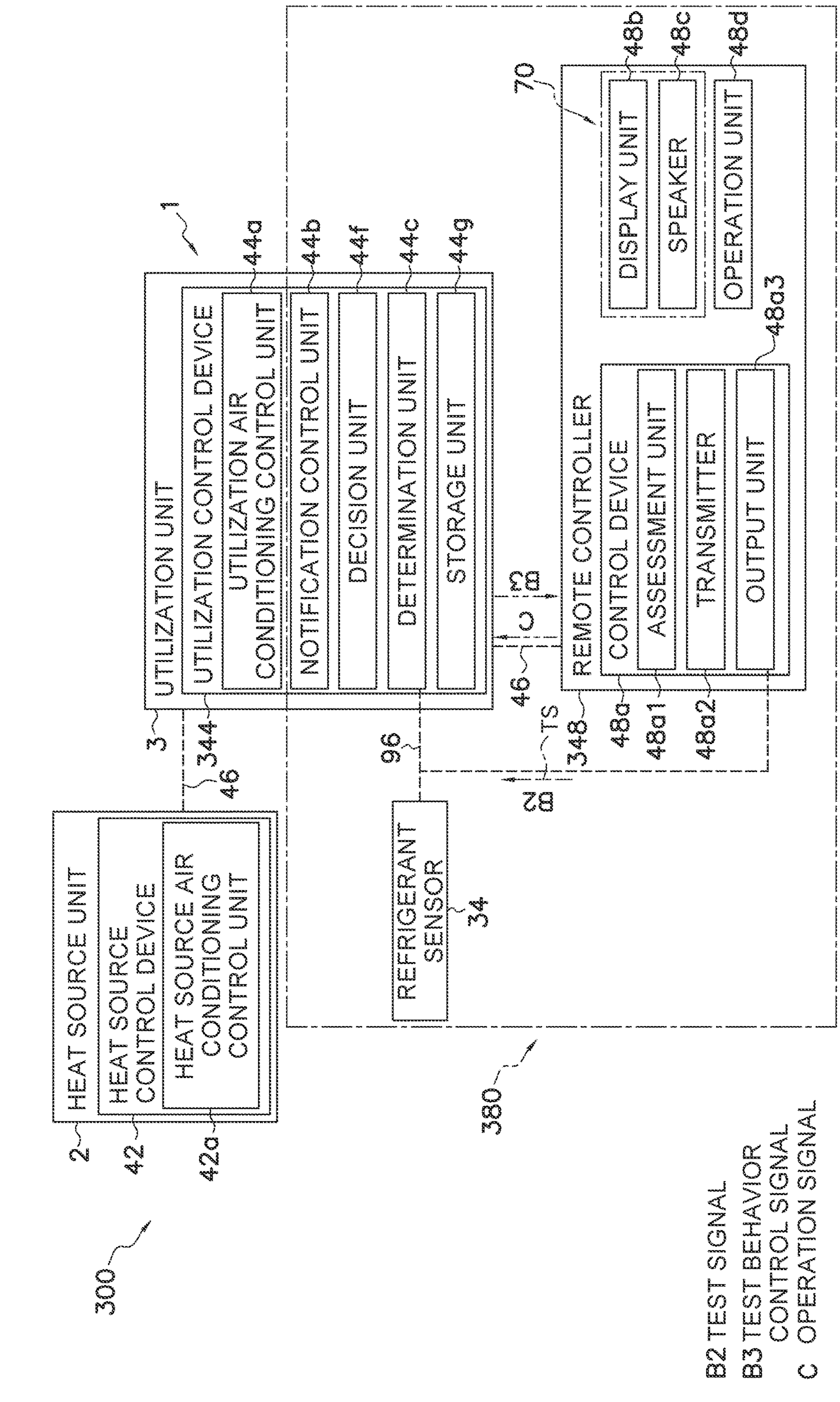
FIG. 9 is a block diagram of an air conditioning system according to a modification example F, indicating, by means of arrows, flows of signals upon testing of a leakage notifying circuit in a refrigerant leakage notifying device.

The air conditioning system and the refrigerant leakage notifying device may alternatively be configured as an air conditioning system 300 and a refrigerant leakage notifying device 380 as exemplarily depicted in FIG. 9. Description is made mainly to differences of the air conditioning system 300 and the refrigerant leakage notifying device 380 from the air conditioning system 100 and the refrigerant leakage notifying device 80, and similar characteristics will not be described below. The following description includes identical reference signs for constituents similar to those according to the above embodiment.

The air conditioning system 300 and the refrigerant leakage notifying device 380 are different from the air conditioning system 100 and the refrigerant leakage notifying device 80 according to the above embodiment in some of functions of a remote controller 348 and some of functions of a utilization control device 344.

The remote controller 348 does not transmit the output command signal to the utilization control device 344, but outputs the test signal TS directly to the determination unit 44*c* of the utilization control device 344. The remote controller 348 includes an output unit 48*a*3 configured to output the test signal TS to the determination unit 44*c*. The output unit 48*a*3 transmits the test signal TS to the determination unit 44*c* when the determination unit 48*a*1 determines that operation received by the operation unit 48*d* is the predetermined operation and the transmitter 48*a*2 transmits the operation signal C (see an arrow for B2 in FIG. 9). FIG. 9 relates to an aspect of transmitting the test signal TS via a signal line different from the communication line 46. The test signal TS may alternatively be transmitted via the communication line 46.

The utilization control device 344 does not include the reception unit 44*d* or the output unit 44*e*. The decision unit 44*f* decides whether a signal received by the determination unit 44*c* is the detection signal DS or the test signal TS in accordance with a method similar to the decision method 1 described in the above embodiment or the like.

Supplementary Note

The embodiment of the present disclosure has been described above. Various modifications to modes and details should be available without departing from the object and the scope of the present disclosure recited in the claims.

The present disclosure usefully provides a refrigeration cycle system enabling reduction in time and effort for inspection of the notification unit in terms of refrigerant leakage.

The invention claimed is:

1. A refrigeration cycle system comprising:

a refrigeration cycle apparatus including a refrigerant circuit;

an operation signal transmitter configured to transmit an operation signal in response to an operation performed by a user to operate the refrigeration cycle apparatus;

a first determination unit configured to determine whether the operation signal is a predetermined operation signal of a predetermined type;

a detection unit configured to detect leakage of a refrigerant;

a notification unit configured to notify of leakage of the refrigerant by emitting at least one of sound and light in a case in which the detection unit has detected leakage of the refrigerant; and a processing unit configured to transmit an output command signal to cause the notification unit to execute test behavior of emitting at least one of sound and light in a case in which the first determination unit determines that the operation signal is the predetermined operation signal.

2. The refrigeration cycle system according to claim 1, wherein the operation signal transmitter is a remote controller configured to transmit operation signals to the refrigeration cycle apparatus.

3. The refrigeration cycle system according to claim 2, wherein the remote controller includes the notification unit.

4. The refrigeration cycle system according to claim 1, wherein the predetermined operation signal corresponds to at least one of an activation signal for the refrigeration cycle apparatus and a stop signal for the refrigeration cycle apparatus.

5. The refrigeration cycle system according to claim 1, wherein a time during which the notification unit emits at least one of sound and light during the test behavior is shorter than a time during which the notification unit emits at least one of sound and light in a case in which the detection unit detects leakage of the refrigerant.

6. The refrigeration cycle system according to claim 1, wherein the notification unit is configured to notify by emitting sound, and a volume of sound emitted by the notification unit during the test behavior is lower than a volume of sound emitted by the notification unit in a case in which the detection unit has detected leakage of the refrigerant.

7. The refrigeration cycle system according to claim 1, further comprising:

a second determination unit configured to receive a detection signal outputted from the detection unit according to a detection result of the refrigerant and to determine leakage of the refrigerant in accordance with the detection signal received; and an output unit provided separately from the detection unit, the output unit being configured to output a test signal to the second determination unit in a case in which the operation signal transmitter transmits the predetermined operation signal, the test signal being a signal indicating that the second determination unit has determined leakage of the refrigerant in a case in which the second determination unit has received the signal, and the processing unit being configured to cause the notification unit to execute the test behavior in a case in which the second determination unit has determined leakage of the refrigerant in accordance with the test signal.

8. The refrigeration cycle system according to claim 1, wherein the refrigerant is flammable.

9. The refrigeration cycle system according to claim 2, wherein the predetermined operation signal corresponds to at least one of an activation signal for the refrigeration cycle apparatus and a stop signal for the refrigeration cycle apparatus.

10. The refrigeration cycle system according to claim 2, wherein a time during which the notification unit emits at least one of sound and light during the test behavior is shorter than a time during which the notification unit emits at least one of sound and light in a case in which the detection unit detects leakage of the refrigerant.

11. The refrigeration cycle system according to claim 2, wherein the notification unit is configured to notify by emitting sound, and a volume of sound emitted by the notification unit during the test behavior is lower than a volume of sound emitted by the notification unit in a case in which the detection unit has detected leakage of the refrigerant.

12. The refrigeration cycle system according to claim 2, further comprising:

a second determination unit configured to receive a detection signal outputted from the detection unit according to a detection result of the refrigerant and to determine leakage of the refrigerant in accordance with the detection signal received; and an output unit provided separately from the detection unit, the output unit being configured to output a test signal to the second determination unit in a case in which the operation signal transmitter transmits the predetermined operation signal, the test signal being a signal indicating that the second determination unit has determined leakage of the refrigerant in a case in which the second determination unit has received the signal, and the processing unit is being configured to cause the notification unit to execute the test behavior in a case in which the second determination unit has determined leakage of the refrigerant in accordance with the test signal.

13. The refrigeration cycle system according to claim 2, wherein the refrigerant is flammable.

14. The refrigeration cycle system according to claim 4, wherein a time during which the notification unit emits at least one of sound and light during the test behavior is shorter than a time during which the notification unit emits at least one of sound and light in a case in which the detection unit detects leakage of the refrigerant.

15. The refrigeration cycle system according to claim 4, wherein the notification unit is configured to notify by emitting sound, and a volume of sound emitted by the notification unit during the test behavior is lower than a volume of sound emitted by the notification unit in a case in which the detection unit has detected leakage of the refrigerant.

16. The refrigeration cycle system according to claim 4, further comprising:

a second determination unit configured to receive a detection signal outputted from the detection unit according to a detection result of the refrigerant and to determine leakage of the refrigerant in accordance with the detection signal received; and an output unit provided separately from the detection unit, the output unit being configured to output a test signal to the second determination unit in a case in which the operation signal transmitter transmits the predetermined operation signal, the test signal being a signal indicating that the second determination unit has determined leakage of the refrigerant in a case in which the second determination unit has received the signal, and the processing unit is being configured to cause the notification unit to execute the test behavior in a case in which the second determination unit has determined leakage of the refrigerant in accordance with the test signal.

17. The refrigeration cycle system according to claim 4, wherein the refrigerant is flammable.

18. The refrigeration cycle system according to claim 5, wherein the notification unit is configured to notify by emitting sound, and a volume of sound emitted by the notification unit during the test behavior is lower than a volume of sound emitted by the notification unit in a case in which the detection unit has detected leakage of the refrigerant.

19. The refrigeration cycle system according to claim 5, further comprising:

a second determination unit configured to receive a detection signal outputted from the detection unit according to a detection result of the refrigerant and to determine leakage of the refrigerant in accordance with the detection signal received; and an output unit provided separately from the detection unit, the output unit being configured to output a test signal to the second determination unit in a case in which the operation signal transmitter transmits the predetermined operation signal, the test signal being a signal indicating that the second determination unit has determined leakage of the refrigerant in a case in which the second determination unit has received the signal, and the processing unit being configured to cause the notification unit to execute the test behavior in a case in which the second determination unit has determined leakage of the refrigerant in accordance with the test signal.

20. The refrigeration cycle system according to claim 5, wherein the refrigerant is flammable.

* * * * *